US011572423B2

(12) United States Patent
Reed et al.

(10) Patent No.: US 11,572,423 B2
(45) Date of Patent: Feb. 7, 2023

(54) PROCESSES FOR INTRODUCTION OF LIQUID ACTIVATORS IN OLEFIN POLYMERIZATION REACTIONS

(71) Applicant: ExxonMobil Chemical Patents Inc., Baytown, TX (US)

(72) Inventors: Aaron H. Reed, League City, TX (US); Rong Ma, Houston, TX (US); Catherine A. Faler, Houston, TX (US)

(73) Assignee: EXXONMOBIL CHEMICALS PATENTS INC., Baytown, TX (US)

( * ) Notice: Subject to any disclaimer, the term of this patent is extended or adjusted under 35 U.S.C. 154(b) by 132 days.

(21) Appl. No.: 17/108,563

(22) Filed: Dec. 1, 2020

(65) Prior Publication Data

US 2021/0189022 A1 Jun. 24, 2021

Related U.S. Application Data

(60) Provisional application No. 62/946,594, filed on Dec. 11, 2019.

(51) Int. Cl.
*C08F 2/01* (2006.01)
*B01J 19/06* (2006.01)
(Continued)

(52) U.S. Cl.
CPC ............. *C08F 2/01* (2013.01); *B01J 19/0006* (2013.01); *B01J 19/06* (2013.01); *B01J 19/2465* (2013.01);
(Continued)

(58) Field of Classification Search
CPC ........... C08F 2/01; C08F 4/65908; G01F 1/00
(Continued)

(56) References Cited

U.S. PATENT DOCUMENTS

| | | | |
|---|---|---|---|
| 5,919,983 A | 7/1999 | Rosen et al. | |
| 6,800,701 B2 | 10/2004 | Campbell, Jr. et al. | |

(Continued)

FOREIGN PATENT DOCUMENTS

| | | | |
|---|---|---|---|
| JP | 2003316069 | 11/2003 | |
| JP | 2006-169431 A * | 6/2006 | ............ C08G 63/87 |

(Continued)

OTHER PUBLICATIONS

Machine-generated translation of written description of JP 2006-169431; retrieved from ESPACENET on Jun. 7, 2022. (Year: 2006).*

(Continued)

*Primary Examiner* — Fred M Teskin

(57) ABSTRACT

The present disclosure provides methods and systems for introducing an activator to a polymerization reactor. The methods may include introducing liquid activator to a mixing vessel or an inline mixer and mixing aliphatic hydrocarbon solvent to form an activator solution which is introduced to a polymerization reactor. The systems may include a storage vessel, a mixing vessel or inline mixer configured to mix a liquid activator with a hydrocarbon solvent, and a polymerization reactor. The present disclosure also provides a process for producing a polyolefin. The process may include introducing liquid activator to an inline mixer and mixing an aliphatic hydrocarbon solvent with the liquid activator to form an activator solution. The process may include introducing the activator solution, a catalyst, and an olefin feed to a polymerization reactor.

19 Claims, 4 Drawing Sheets

(51) Int. Cl.

| | |
|---|---|
| ***B01J 19/24*** | (2006.01) |
| ***B01J 19/00*** | (2006.01) |
| ***G01F 1/00*** | (2022.01) |
| ***C08F 10/02*** | (2006.01) |

(52) U.S. Cl.
CPC ................ *C08F 10/02* (2013.01); *G01F 1/00* (2013.01); *B01J 2219/00164* (2013.01); *B01J 2219/00182* (2013.01); *B01J 2219/00186* (2013.01)

(58) Field of Classification Search
USPC .................................................... 526/88, 919
See application file for complete search history.

(56) References Cited

U.S. PATENT DOCUMENTS

| | | | | |
|---|---|---|---|---|
| 7,087,602 | B2 | 8/2006 | Thomas et al. | |
| 7,101,940 | B2 | 9/2006 | Schottek et al. | |
| 7,799,879 | B2 | 9/2010 | Crowther et al. | |
| 8,580,902 | B2 | 11/2013 | Crowther et al. | |
| 8,642,497 | B2 | 2/2014 | Berris | |
| 8,956,573 | B2 * | 2/2015 | Fouarge ................ | C08F 110/02 137/565.17 |
| 9,951,153 | B2 | 4/2018 | Sun et al. | |
| 10,544,246 | B2 | 1/2020 | Jiang et al. | |
| 11,041,031 | B2 | 6/2021 | Faler et al. | |
| 2018/0044453 | A1 | 2/2018 | Jiang et al. | |
| 2018/0223020 | A1 | 8/2018 | Moorhouse et al. | |
| 2019/0247821 | A1 * | 8/2019 | Eswaran ................. | C08F 10/02 |
| 2019/0330392 | A1 | 10/2019 | Faler et al. | |
| 2019/0330394 | A1 | 10/2019 | Faler et al. | |
| 2020/0339509 | A1 | 10/2020 | Faler et al. | |

FOREIGN PATENT DOCUMENTS

| | | |
|---|---|---|
| WO | 2010014344 | 2/2010 |
| WO | 2019/210029 | 10/2019 |

OTHER PUBLICATIONS

U.S. Appl. No. 63/063,596, filed Aug. 10, 2020.

* cited by examiner

PROCESSES FOR INTRODUCTION OF LIQUID ACTIVATORS IN OLEFIN POLYMERIZATION REACTIONS

CROSS-REFERENCE TO RELATED APPLICATIONS

This application claims priority to U.S. Ser. No. 62/946,594, filed Dec. 11, 2019, herein incorporated by reference.

FIELD

The present disclosure provides processes and systems for introduction of liquid activators to olefin polymerization reactors.

BACKGROUND

Polyolefins are widely used commercially because of their robust physical properties. Polyolefins are typically prepared with an activated catalyst that polymerizes olefin monomers. Catalysts for olefin polymerization are often based on metallocenes as catalyst precursors, which are activated either with an alumoxane or an activator containing a non-coordinating anion. A non-coordinating anion, is capable of stabilizing the resulting metal cation of the catalyst. Because such activators are fully ionized and the corresponding anion is highly non-coordinating, such activators can be effective as olefin polymerization catalyst activators. However, because they are ionic salts, such activators are typically insoluble in aliphatic hydrocarbons and only sparingly soluble in aromatic hydrocarbons. The insolubility or partial solubility of previous activators leads to inaccuracies in measuring quantities and also develops a need to pre-mix activators and catalysts using complicated systems with various mixing and holding vessels in order to provide activated catalyst to olefin polymerization reactors.

Furthermore, it is desirable to conduct most polymerizations of α-olefins in aliphatic hydrocarbon solvents due to the compatibility of such solvents with the olefin monomer and in order to reduce the aromatic hydrocarbon content of the resulting polymer product. Typically, ionic salt activators are added to such polymerizations in the form of a solution in an aromatic solvent such as toluene. The use of even a small quantity of such an aromatic solvent to introduce the activator into the polymerization reactor can be undesirable since the aromatic solvent is removed in a post-polymerization devolatilization step and separated from other volatile components, which is a process that adds significant cost and complexity to commercial production of polyolefins. Additionally, activators may exist in the form of a solid, or an oily, intractable material which is not readily handled and metered or precisely incorporated into the reaction mixture. There remains a need for methods of providing for introduction of liquid activators to olefin polymerization reactors.

Another problem with previously designed systems for dispensing and premixing activators is that these systems are unnecessarily complex and costly, both in installation and operation. Available systems are voluminous and cumbersome, and may involve several tanks for storing and diluting activator or the combination of activator and catalyst. In addition, the use of large vessels and large amounts of diluent for preparing catalyst and activator slurries increases initial costs and greatly increases the costs associated with devolatilization of polyolefin products.

There is a need for improved processes allowing for measurement in the use and introduction of liquid activators to olefin polymerization reactors.

SUMMARY

The present disclosure provides a method for introducing an activator to a polymerization reactor including introducing an amount of liquid activator to a mixing vessel. The method includes mixing an aliphatic hydrocarbon solvent with the liquid activator in the mixing vessel to form an activator solution. The method includes introducing the activator solution to a polymerization reactor.

The present disclosure also provides a method for introducing an activator to a polymerization reactor including introducing an amount of liquid activator to an inline mixer. The method includes mixing an aliphatic hydrocarbon solvent with the liquid activator in the inline mixer to form an activator solution. The method includes introducing the activator solution to a polymerization reactor.

Additionally, the present disclosure provides a system for introducing an activator to a polymerization reactor including a storage vessel and a mixing vessel configured to mix a liquid activator and aliphatic hydrocarbon solvent. The mixing vessel is coupled with the storage vessel, and a polymerization reactor is coupled with the mixing vessel.

Furthermore, the present disclosure provides a system for introducing an activator to a polymerization reactor including a storage vessel and an inline mixer configured to mix a liquid activator and aliphatic hydrocarbon solvent. The inline mixer is coupled with the storage vessel, and a polymerization reactor fluidly connected with the inline mixer.

The present disclosure also provides a method for introducing an activator to a polymerization reactor including introducing an amount of aliphatic hydrocarbon solvent to an amount of liquid activator in a vessel to form an activator solution. The method includes introducing the activator solution to a polymerization reactor.

The present disclosure provides a process for producing a polyolefin, the process including introducing an amount of liquid activator to an inline mixer and mixing an aliphatic hydrocarbon solvent with the liquid activator in the inline mixer to form an activator solution. The method includes introducing the activator solution, a catalyst, and an olefin feed to a polymerization reactor.

DETAILED DESCRIPTION

Figure 1:
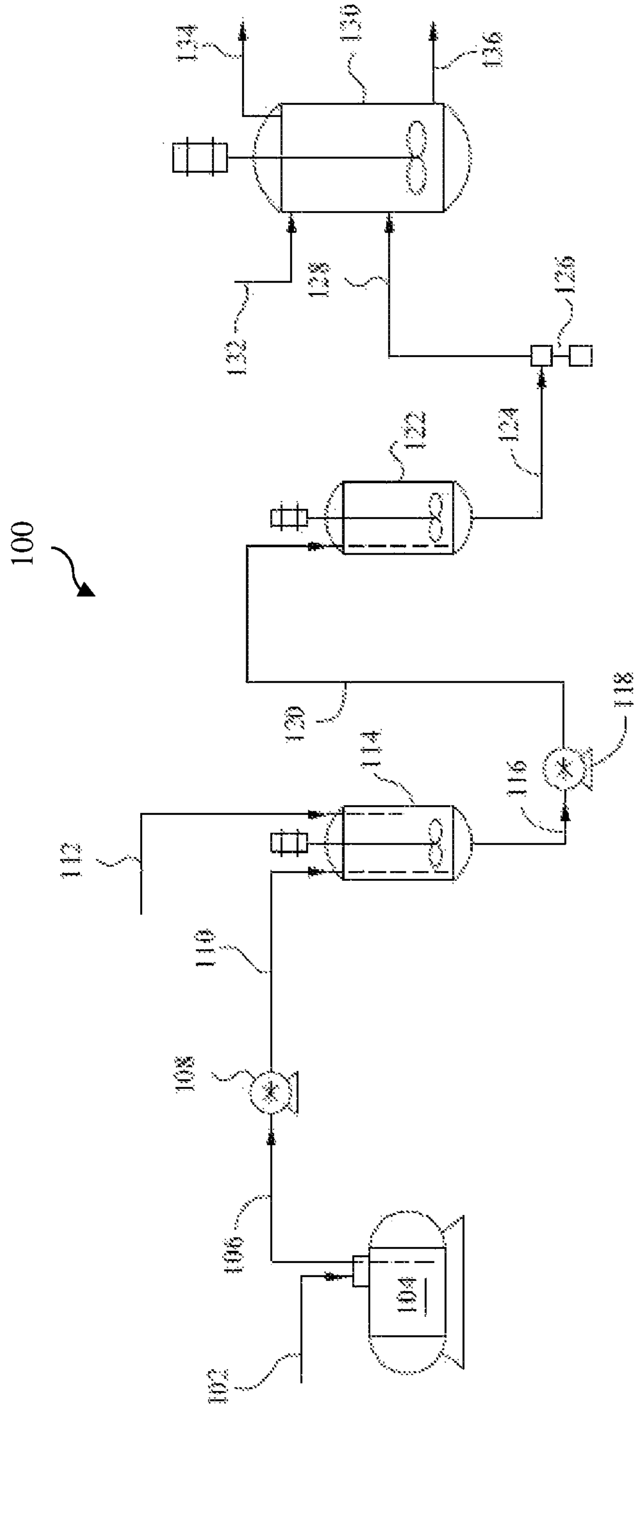
FIG. 1 is a diagram of an apparatus for introduction of activator to an olefin polymerization reactor according to an embodiment.

A "storage tank" is a vessel capable of retaining liquids that is or can be made to be nonreactive to activators. A storage tank may include temperature control, pressure control, and/or inert gas purge.

An "inert gas" is a gas which is unreactive in an olefin polymerization process, and includes Helium, Nitrogen, Neon, Argon, Krypton, and $C_2$-$C_6$ saturated hydrocarbons, such as ethane, propane, butane, isobutane, isopentane, neopentane, and/or hexane.

An "aliphatic hydrocarbon" is a compound containing carbon and hydrogen joined together in straight chains, branched chains, and/or non-aromatic rings.

A "liquid" is a compound that is a liquid (in the absence of additional solvent) at room temperature (20° C.) at a pressure of 1 atmosphere.

A "flowmeter" is an instrument capable of measuring the rate of flow of a fluid and may be used to measure the flow through a connecting pipe or line.

A "metering valve" is a valve with variable positioning and control that is capable of regulating the flow of a fluid, such as needle valves, or other valves containing one or more of (i) a fine annular gap; (ii) a helical coiled cross section; and/or (iii) a sinter or felt insert. A metering valve may regulate the flow of fluid automatically or manually and may include hydraulic, pneumatic, and solenoid style valves.

A "mixing vessel" is a vessel capable of batch mixing activator and hydrocarbon solvent, may simply be a storage tank, or may include internal or external agitation including motorized rotation of blenders, baffles, or the tank itself. A mixing vessel may also include temperature control, pressure control, and/or an inert gas purge.

An "inline mixer" is a vessel or pipe capable of flow through mixing and may include static or non-static mixing, for example, an inline mixer may include baffles, flow division, radial, plate type, liquid whistle, V blender, static paddle blender or other static mixers and may include non-static inline mixers such as ribbon blenders, V blenders, or paddle blenders.

A "pump" is a device using pressure to move fluids, and specifically includes metering pumps designed to provide specific flow rates, such as piston pumps or double piston pumps that may provide near constant flow rates in a wide array of discharge pressures.

A "pump station" includes one or more pumps and a flowmeter; the flowmeter may be included in the one or more pumps or as a separate device.

A "charge vessel" is a vessel where activator solution may be stored before being introduced to the reactor, including storage tanks, mixing vessels, or other vessels.

The terms "cocatalyst" and "activator" are used interchangeably and are defined to be a compound, including an NCA, which can activate catalyst compounds of the present disclosure by converting the neutral catalyst compound to a catalytically active catalyst compound cation.

"Noncoordinating anion" (NCA) means an anion either that does not coordinate to the catalyst metal cation or that does coordinate to the metal cation, but only weakly. The term NCA is also defined to include multicomponent NCA-containing activators, such as N,N-dioctadecylanilinium tetrakis(perfluoronaphthyl)borate or N,N-isotridecylanilinium tetrakis(perfluoronaphthyl)borate, that contain an acidic cationic group and the non-coordinating anion. The term NCA is also defined to include neutral Lewis acids, such as tris(pentafluoronaphthyl)boron, that can react with a catalyst to form an activated species by abstraction of an anionic group. An NCA coordinates weakly enough that a neutral Lewis base, such as an olefinically or acetylenically unsaturated monomer can displace the NCA from the catalyst center. A metal or metalloid that can form a compatible, weakly coordinating complex may be used or contained in the noncoordinating anion. Suitable metals can include aluminum, gold, and platinum. Suitable metalloids can include boron, aluminum, phosphorus, and silicon. The term non-coordinating anion activator includes neutral activators, ionic activators, and Lewis acid activators.

"Compatible" non-coordinating anions can be those which are not degraded to neutrality when the initially formed complex decomposes. Further, the anion will not transfer an anionic substituent or fragment to the cation so as to cause the combination of cation and substituent or fragment to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

Description

The present disclosure relates to processes for the introduction of activator compounds that can be used in olefin polymerization processes. For example, the present disclosure provides processes for mixing and introducing activators to a polymerization reactor. In the present disclosure, activators have ammonium or phosphonium groups with long-chain aliphatic hydrocarbyl groups for improved solubility of the activator in aliphatic solvents, as compared to conventional activator compounds.

The present disclosure provides measurement, mixing, and introduction of activators, including ammonium borate activators. In the present disclosure, activators are described that feature ammonium groups with long-chain aliphatic hydrocarbyl groups for improved solubility of the activator in aliphatic solvents, as compared to conventional activator compounds. It has been discovered that systems and processes for introduction of liquid activators of the present disclosure may provide introduction of quantities of activators and also may decrease capital expenditures, decrease operating and maintenance expenditures, when compared to conventional systems and processes.

Processes and Systems for Measurement, Mixing, and Introduction of Activators

The activator compounds further illustrated below may be stored in a storage tank as substantially pure liquids or dissolved in hydrocarbon solvent(s), such as aliphatic hydrocarbons, at a known concentration, an "activator solution." Because the activators are liquid they may be measured using measurement techniques for liquids including the use of flowmeters to measure the quantity of liquid added or removed from a storage tank. Previous activators were not accurately measureable in such a manner because they were either solids or oily, intractable materials not readily handled, measured, or metered. Additionally, because the activators are substantially pure liquids, the density can be determined and the flow determined by weight change.

The activators may be dissolved in hydrocarbon solvent at a known concentration in a storage tank, a mixing tank, or inline mixer. Dissolution may be accomplished by determination of the flow or weight of activator and adding the appropriate amount of hydrocarbon solvent. Suitable hydrocarbon solvents include aliphatic and aromatic hydrocarbons. While aromatic hydrocarbon are suitable solvents, their use may be reduced or eliminated because the production of polyolefins free of aromatic hydrocarbons increases the value of the polymer and decreases cost of polymer devolatilization. Suitable hydrocarbon solvents include noncoordinating, inert liquids. Examples of diluents/solvents for polymerization may include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0.1 wt % based upon the combined weight of solvents present.

The systems of the present disclosure may include a storage tank suitable for storage of liquid activator or an activator solution. In at least one embodiment, the activator storage tank is fluidly connected to a polymerization reactor. In another embodiment, the activator storage tank is fluidly connected with a pump station fluidly connected to a polymerization reactor. It may be advantageous to allow for dilution of the activator or activator solution to allow for precise introduction of small quantities of activator to the polymerization reactor. Dilution may occur in a mixing vessel, an inline mixer, a charge vessel, or direct dilution of activator in a storage tank.

FIG. 1 is a flow diagram of an example apparatus 100 for introduction of liquid activator into an olefin polymerization reactor. As shown in FIG. 1, the liquid activator may be stored in storage tank 104, which may be pressurized by inert gas line 102. Pressures in storage tank 104 may be from about 150 kPa to about 1500 kPa, such as about 800 kPa to about 1000 kPa. The activator may exit storage tank 104 via line 106 and be introduced to first optional pump 108. The activator, via line 110, may be combined with hydrocarbon solvent, such as aliphatic hydrocarbon, via line 112 in mixing vessel 114 forming an activator solution. Alternatively, a solution of liquid activator in hydrocarbon solvent may be stored in storage tank 104 and addition of hydrocarbon solvent, such as aliphatic hydrocarbon, via line 112 serves to dilute the activator solution to a second concentration. Lines 106 or 110 may contain a flowmeter (not shown) and/or metering valves (not shown) to measure and/or dispense the amount of activator entering mixing vessel 114. Similarly, line 112 may include a flowmeter (not shown) and/or metering valve (not shown) to measure and/or dispense an amount of hydrocarbon solvent to mixing vessel 114. The concentration of activator in the activator solution may be known in the mixing vessel, or samples may be taken from mixing vessel 114 or from other points in the system to determine concentration of activator in the activator solution. The activator solution may have a molarity of about 0.1 mM to 100 mM, such as 30 mM to 50 mM. The activator solution may exit mixing vessel 114 through line 116 to second optional pump 118 and then be introduced via line 120 to charge vessel 122.

Charge vessel 122 may be used as a holding tank for activator solution to be used in polymerization reactions. Charge vessel 122 may be any suitable charge vessel and the activator solution may exit charge vessel 122 via line 124 and be introduced to pump station 126. Pump station 126 may be designed to pump amounts of activator solution via line 128 to polymerization reactor 130. For example pump station 126 may include adjustable membrane pumps that allow for transfer of activator solution at a controllable flow rate. For example, suitable flow rates of activator solutions may include 0.1 L/h to 500 L/h, such as 30 L/h to 50 L/h. Other reactants, reagents, and materials may enter polymerization reactor 130 through additional inlet lines, such as line 132. For example, catalysts, co-catalyst, scavengers, co-activators, olefins, inert gases, support material, and other additives may all be added to polymerization reactor 130 through additional inlet lines. Additionally, the polymerization reactor may have one or more outlet lines for removal of products, by-products, or reagents, such as overhead line 134 and bottoms line 136.

Figure 2:
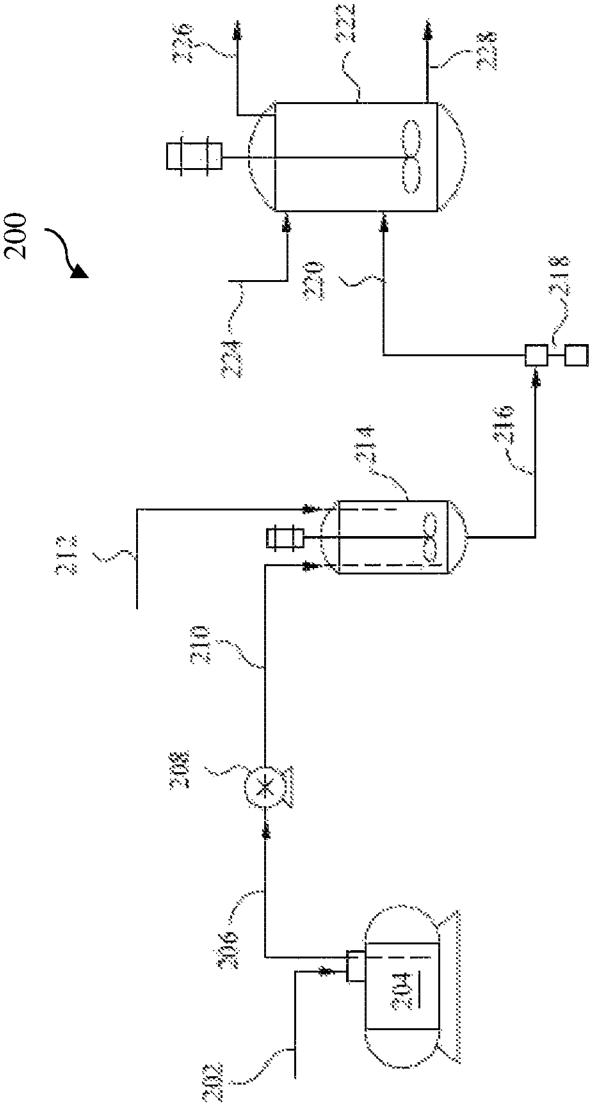
FIG. 2 is a diagram of an apparatus for introduction of activator to an olefin polymerization reactor according to an embodiment.

FIG. 2 is a flow diagram of an example apparatus 200 for introduction of liquid activator into an olefin polymerization reactor, according to another embodiment. As shown in FIG. 2, the liquid activator may be stored in storage tank 204, which may be pressurized by inert gas line 202. Pressures in storage tank 204 may be from about 150 kPa to about 1500 kPa, such as about 800 kPa to about 1000 kPa. The activator may exit storage tank 204 via line 206 to first optional pump 208. The activator via line 210 may be combined with hydrocarbon solvent, such as aliphatic hydrocarbon, via line 212 in mixing vessel 214 forming an activator solution. Line 206 or line 210 may contain a flowmeter (not shown) and/or metering valves (not shown) to measure and/or dispense the amount of activator entering mixing vessel 214. Similarly, line 212 may include a flowmeter (not shown) and/or metering valve (not shown) to measure and/or dispense the amount of hydrocarbon solvent entering mixing vessel 214. The concentration of activator in the activator solution may be known in the mixing vessel, or samples may be taken from mixing vessel 214 or from other points in the system to determine concentration of activator. The activator solution may have a molarity of about 0.1 mM to 100 mM, such as 30 mM to 50 mM. The activator solution may exit mixing vessel 214 through line 216 and be introduced to pump station 218. Pump station 218 may be designed to pump amounts of activator solution via line 220 to polymerization reactor 222. For example, pump station 218 may include adjustable membrane pumps that allow for introduction of activator solution at a controllable flow rate. For example, suitable flow rates of activator solutions may include 0.1 L/h to 500 L/h, such as 30 L/h to 50 L/h. Other reactants, reagents, and materials may enter polymerization reactor 222 through additional inlet lines, such as line 224. For example, catalysts, co-catalyst, scavengers, co-activators, olefins, inert gases, support material, and other additives may all be added to polymerization reactor 222 through additional inlet lines. Additionally, the polymerization reactor may have one or more outlet lines for removal of products, by-products, or reagents, such as overhead line 226 and bottoms line 228.

Figure 3:
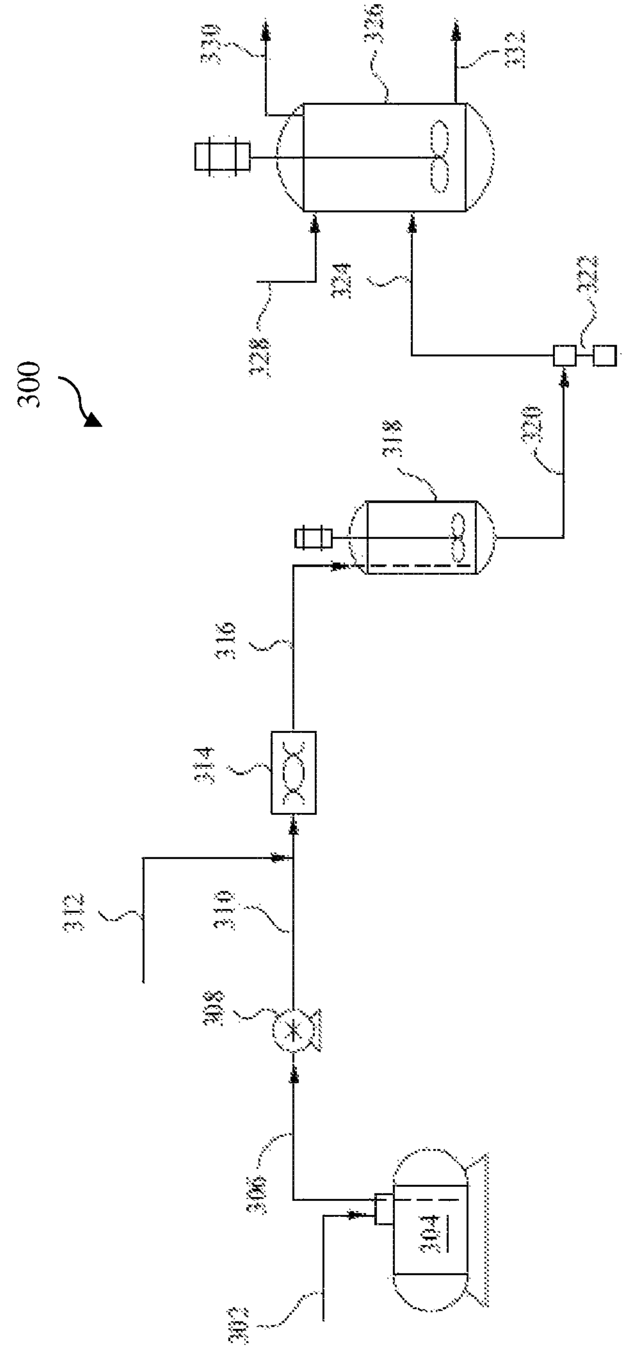
FIG. 3 is a diagram of an apparatus for introduction of activator to an olefin polymerization reactor according to an embodiment.

FIG. 3 is a flow diagram of an example apparatus 300 for introduction of liquid activator into an olefin polymerization reactor, according to another embodiment. As shown in FIG. 3, the liquid activator may be stored in storage tank 304, which may be pressurized by inert gas line 302. Pressures in storage tank 304 may be from about 150 kPa to about 1500 kPa, such as about 800 kPa to about 1000 kPa. The activator may exit storage tank 304 via line 306 to first optional pump 308. The activator via line 310 may be combined with hydrocarbon solvent, such as aliphatic hydrocarbon, via line 312 in inline mixer 314 to form an activator solution. Line 306 or line 310 may contain a flowmeter (not shown) and/or metering valves (not shown) to measure and/or dispense the amount of activator entering inline mixer 314. Similarly, line 312 may include a flowmeter (not shown) and/or metering valve (not shown) to measure and/or dispense the amount of hydrocarbon solvent entering inline mixer 314. The activator solution may exit inline mixer 314 through line 316 and be introduced to mixing vessel 318. The concentration of activator in the activator solution may be known in the mixing vessel, or samples may be taken from mixing vessel 318 or from other points in the system to determine concentration of activator. The activator solution may have a molarity of about 0.1 mM to 100 mM, such as 30 mM to 50 mM. The activator solution may exit mixing vessel 318 through line 320 and be introduced to pump station 322. Pump station 322 may be designed to pump amount(s) of activator solution via line 324 to polymerization reactor 326. For example, pump station 322 may include adjustable membrane pumps that allow for introduction of activator solution at a controllable flow rate. For example, suitable flow rates of activator solutions may include 0.1 L/h to 500 L/h, such as 30 L/h to 50 L/h. Other reactants, reagents, and materials may enter polymerization reactor 326 through additional inlet lines, such as line 328. For example, catalysts, co-catalyst, scavengers, co-activators, olefins, inert gases, support material, and other additives may all be added to polymerization reactor 326 through additional inlet lines. Additionally, the polymerization reactor may have one or more outlet lines for removal of products, by-products, or reagents, such as overhead line 330 and bottoms line 332.

Figure 4:
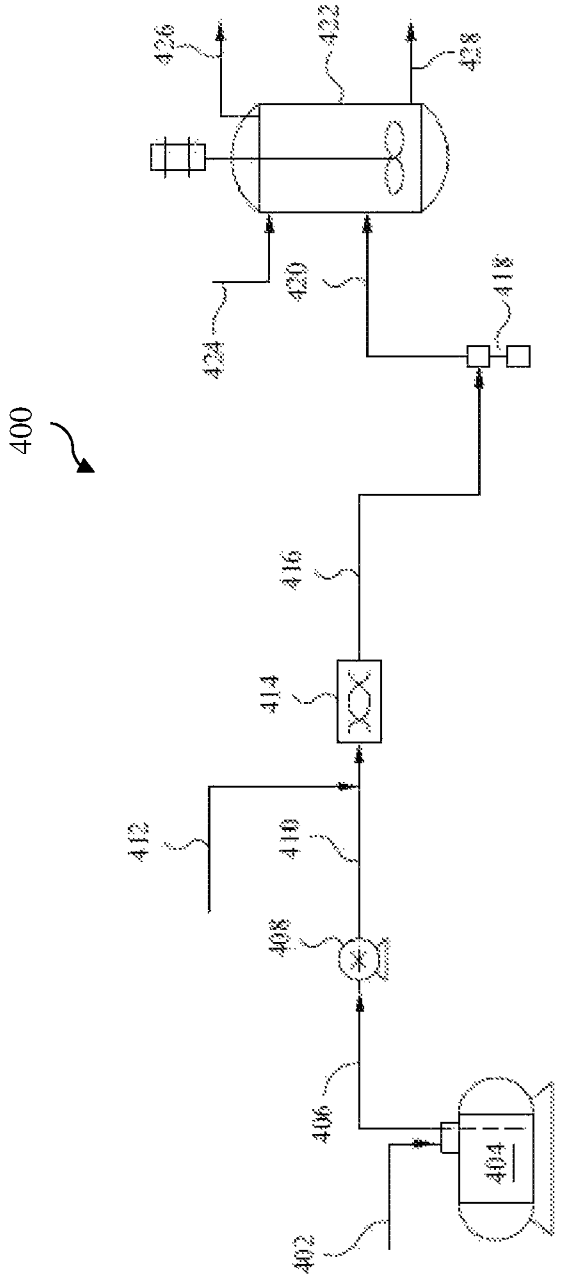
FIG. 4 is a diagram of an apparatus for introduction of activator to an olefin polymerization reactor according to an embodiment.

FIG. 4 is a flow diagram of an example apparatus 400 for introduction of liquid activator into an olefin polymerization reactor, according to another embodiment. As shown in FIG. 4, the liquid activator may be stored in storage tank 404, which may be pressurized by inert gas line 402. Pressures in storage tank 404 may be from about 150 kPa to about 1500 kPa, such as about 800 kPa to about 1000 kPa. The activator may exit storage tank 404 via line 406 to first optional pump 408. The activator via line 410 may be combined with hydrocarbon solvent, such as aliphatic hydrocarbon, via line 412 in an inline mixer 414 to form an activator solution. The activator solution may have a molarity of about 0.1 mM to 100 mM, such as 30 mM to 50 mM. Line 406 or line 410 may contain a flowmeter (not shown) and/or a metering valve (not shown) to measure and/or dispense an amount of activator entering inline mixer 414. Similarly, line 412 may include a flowmeter (not shown) and/or a metering valve (not shown) to measure and/or dispense an amount of hydrocarbon solvent entering inline mixer 414. The activator solution may exit inline mixer 414 through line 416 to enter pump station 418. Pump station 418 may be designed to pump amounts of activator solution via line 420 to polymerization reactor 422. For example, pump station 418 may include adjustable membrane pumps that allow for introduction of activator solution at a controllable flow rate. For example, suitable flow rates of activator solutions may include 0.1 L/h to 500 L/h, such as 30 L/h to 50 L/h. Other reactants, reagents, and materials may enter polymerization reactor 422 through additional inlet lines, such as line 424. For example, catalysts, co-catalyst, scavengers, co-activators, olefins, inert gases, support material, and other additives may all be added to polymerization reactor 422 through additional inlet lines. Additionally, polymerization reactor may have one or more outlet lines for removal of products, by-products, or reagents, such as overhead line 426 and bottoms line 428.

Activators

The systems and processes of the present disclosure include activators, such as ammonium or phosphonium metallate or metalloid activator compounds, including ammonium or phosphonium groups with long-chain aliphatic hydrocarbyl groups combined with metallate or metalloid anions, such as borates or aluminates which are NCAs. Activators suitable for use in the systems and processes of the present disclosure include NCA activators that are soluble in aliphatic solvent.

In one or more embodiments, a 20 wt % mixture of the compound in n-hexane, isohexane, cyclohexane, methylcyclohexane, or a combination thereof, forms a clear homogeneous solution at 25° C. In some embodiments, a 30 wt % mixture of the compound in n-hexane, isohexane, cyclohexane, methylcyclohexane, or a combination thereof, forms a clear homogeneous solution at 25° C.

In some embodiments, an activator has a solubility of more than 10 mM (or more than 20 mM, or more than 50 mM) at 25° C. (stirred 2 hours) in methylcyclohexane. In some embodiments, an activator has a solubility of more than 1 mM (or more than 10 mM, or more than 20 mM) at 25° C. (stirred 2 hours) in isohexane. In some embodiments, an activator has a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

Additionally, activators suitable for use in the systems and processes of the present disclosure include NCA activators that are liquid at room temperature and have a density of about 0.5 g/ml to about 1 g/ml, such as about 0.7 g/ml to about 0.9 g/ml.

It is within the scope of the present disclosure to use an ionizing activator, neutral or ionic. It is also within the scope of the present disclosure to use neutral or ionic activators alone or in combination with alumoxane or modified alumoxane activators.

Activators suitable for use in the systems and processes of the present disclosure may include a cation and an anion together forming activator compounds represented by Formula (I) or (AI):

$$[R^1R^2R^3EH]^+[BR^4R^5R^6R^7]^- \quad (I)$$

$$[R^1R^2R^3EH]^{d+}[M^{k+}Q_n]^{d-} \quad (AI)$$

where:

M is a group 13 atom, such as B or Al;

d is 1, 2 or 3; k is 1, 2, or 3; n is 1, 2, 3, 4, 5, or 6 (such as 1, 2, 3, or 4); n−k=d;

E is nitrogen or phosphorous;

M is an element selected from group 13 of the Periodic Table of the Elements, such as boron or aluminum;

each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl Radical;

each of $R^1$, $R^2$, and $R^3$ is independently hydrogen, $C_1$-$C_{40}$ alkyl or $C_5$-$C_{50}$-aryl, where each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl;

where $R^1$, $R^2$, and $R^3$ together comprise 15 or more carbon atoms, such as 18 or more carbon atoms, such as 20 or more carbon atoms, such as 22 or more carbon atoms, such as 25 or more carbon atoms, such as 30 or more carbon atoms, such as 35 or more carbon atoms, such as 40 or more carbon atoms; and each of $R^4$, $R^5$, $R^6$, and $R^7$ is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Both the cation part of formulas (A1) and (I) as well as the anion part thereof, which is an NCA, will be further illustrated below. Combinations of cations and NCAs are suitable to be used as activators in the systems and processes of the present disclosure.

Activators—The Cations

The cation component of the activators (such as those of formulas (AI) and (I) above), is a protonated Lewis base that can be capable of protonating a moiety, such as an alkyl or aryl, from the transition metal compound. Thus, upon release of a neutral leaving group (e.g. an alkane resulting from the combination of a proton donated from the cationic component of the activator and an alkyl substituent of the transition metal compound) transition metal cation results, which is the catalytically active species.

In at least one embodiment, $R^1$, $R^2$ and $R^3$ together include 20 or more carbon atoms, such as 21 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms, such as 15 to 100 carbon atoms, such as 25 to 75 carbon atoms, such as 38 to 70 carbon atoms.

In any embodiment of formula (I) or (AI), each of $R^1$, $R^2$ and $R^3$ may independently be selected from:

1) optionally substituted linear alkyls (such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl, n-tetracosyl, n-pentacosyl, n-hexacosyl, n-heptacosyl, n-octacosyl, n-nonacosyl, or n-tricontyl);

2) optionally substituted branched alkyls (such as alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, alkyl-icosyl (including multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl, etc.), and isomers thereof where each alkyl group is independently a $C_1$ to $C_{40}$, (alternately $C_2$ to $C_{30}$, alternately $C_3$ to $C_{20}$) linear, branched or cyclic alkyl group), such as when the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl;

3) optionally substituted arylalkyls, such as (methylphenyl, ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, tetradecylphenyl, pentadecylphenyl, hexadecylphenyl, heptadecylphenyl, octadecylphenyl, nonadecylphenyl, icosylphenyl, henicosylphenyl, docosylphenyl, tricosylphenyl, tetracosylphenyl, pentacosylphenyl, hexacosylphenyl, heptacosylphenyl, octacosylphenyl, nonacosylphenyl, tricontylphenyl, 3,5,5-trimethylhexylphenyl, dioctylphenyl, 3,3,5-trimethylhexylphenyl, 2,2,3,3,4 pentamethypentylylphenyl, and the like);

4) optionally substituted silyl groups, such as a trialkylsilyl group, where each alkyl is independently an optionally substituted $C_1$ to $C_{20}$ alkyl (such as trimethylsilyl, triethylsilyl, tripropylsilyl, tributylsilyl, trihexylsilyl, triheptylsilyl, trioctylsilyl, trinonylsilyl, tridecylsilyl, triundecylsilyl, tridodecylsilyl, tri-tridecylsilyl, tri-tetradecylsilyl, tri-pentadecylsilyl, tri-hexadecylsilyl, tri-heptadecylsilyl, tri-octadecylsilyl, tri-nonadecylsilyl, or tri-icosylsilyl);

5) optionally substituted alkoxy groups (such as —OR*, where R* is an optionally substituted $C_1$ to $C_{20}$ alkyl or aryl (such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, phenyl, alkylphenyl (such as methyl phenyl, propyl phenyl, etc.), naphthyl, or anthracenyl));

6) halogens (such as Br or Cl); and 7) halogen containing groups (such as bromomethyl, bromophenyl, and the like), provided that at least one of $R^1$, $R^2$ and $R^3$ contains a branched alkyl group.

In at least one embodiment, each of $R^1$, $R^2$, and $R^3$ is independently hydrogen, $C_1$-$C_{40}$ alkyl or $C_5$-$C_{50}$-aryl, where each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl.

In at least one embodiment, $R^1$ and $R^2$ are independently $C_1$-$C_{22}$-alkyl, substituted $C_1$-$C_{22}$-alkyl, unsubstituted phenyl, or substituted phenyl (in at least one embodiment, each of $R^1$, $R^2$ and $R^3$ is independently selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-icosyl);

In some embodiments, $R^1$ is a $C_1$-$C_{20}$ alkyl group (such as a $C_1$-$C_{10}$ alkyl group, a $C_1$ to $C_2$ alkyl, or methyl), where $R^1$ is optionally substituted and each of $R^2$ and $R^3$ is independently an optionally substituted $C_1$-$C_{40}$ alkyl group or aryl and/or para-substituted phenyl group, where the meta and para substituents are, independently, an optionally substituted $C_1$ to $C_4$ hydrocarbyl group, an optionally substituted alkoxy group, an optionally substituted silyl group, a halogen, or a halogen containing group.

In some embodiments, a branched alkyl may have 1 to 30 tertiary or quaternary carbons, alternately 2 to 10 tertiary or quaternary carbons, alternately 2 to 4 tertiary or quaternary carbons, alternately the branched alkyl has 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 tertiary or quaternary carbons.

At Least One Branched R Group

In some embodiments, at least one (alternately one, two or three) of $R^1$, $R^2$, and $R^3$ is a branched alkyl, (such as a $C_3$-$C_{40}$ branched alkyl, alternately such as a $C_7$ to $C_{40}$ branched alkyl).

In some embodiments, each of $R^1$, $R^2$, and $R^3$ is independently $C_1$-$C_{40}$ linear or branched alkyl, $C_5$-$C_{50}$-aryl (such as $C_5$ to $C_{22}$), where each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl, provided that at least one of $R^1$, $R^2$, and $R^3$ is a branched alkyl (such as a $C_3$-$C_{40}$ branched alkyl), such as at least two of $R^1$, $R^2$, and $R^3$ are a branched alkyl (such as a $C_3$-$C_{40}$ branched alkyl), or each of $R^1$, $R^2$, and $R^3$ is a branched alkyl (such as a $C_3$-$C_{40}$ branched alkyl);

In at least one embodiment, each of $R^1$, $R^2$, and $R^3$ is independently $C_1$-$C_{40}$ linear or branched alkyl, $C_5$-$C_{50}$-aryl (such as $C_5$-$C_{22}$-aryl, such as an arylalkyl (where the alkyl has from 1 to 10 carbon atoms and the aryl has from 6 to 20 carbon atoms), or five-, six- or seven-membered heterocyclyl comprising at least one atom selected from N, P, O and S, where each of $R^1$ $R^2$, and $R^3$ is optionally substituted by halogen, —$NR'_2$, —OR' or —$SiR'_3$ (where R' is independently hydrogen or $C_1$-$C_{20}$ hydrocarbyl), where $R^2$ optionally bonds with $R^5$ to independently form a five-, six- or seven-membered ring, and provided that at least one of $R^1$, $R^2$, and $R^3$ is a $C_3$-$C_{40}$ branched alkyl, alternately at least two of $R^1$, $R^2$, and $R^3$ are a $C_3$-$C_{40}$ branched alkyl.

In some embodiments, $R^1$ is a $C_1$-$C_{40}$ linear alkyl, such as methyl; each of $R^2$, and $R^3$ is independently $C_1$-$C_{40}$ linear or branched alkyl, $C_5$-$C_{22}$-aryl, $C_5$ to $C_{50}$ arylalkyl where the alkyl has from 1 to 30 carbon atoms and the aryl has from 6 to 20 carbon atoms, or five-, six- or seven-membered heterocyclyl comprising at least one atom selected from N, P, O and S, where each of $R^1$ $R^2$, and $R^3$ is optionally substituted by halogen, where $R^2$ optionally bonds with $R^5$ to independently form a five-, six- or seven-membered ring, provided that at least one of $R^2$, and $R^3$ is a $C_3$-$C_{40}$ branched alkyl, alternately both of $R^2$, and $R^3$ are a $C_3$-$C_{40}$ branched alkyl, alternately each of $R^1$, $R^2$, and $R^3$ is a $C_3$-$C_{40}$ branched alkyl.

In one or more embodiments, $R^1$ is methyl.

In one or more embodiments, $R^2$ is unsubstituted phenyl or substituted phenyl. In at least one embodiment, $R^2$ is phenyl, methyl phenyl, n-butyl phenyl, n-octadecyl-phenyl, or an isomer thereof, such as $R^2$ is meta or para substituted phenyl, such as meta- or para-substituted alkyl substituted phenyl.

In any embodiment, $R^3$ is branched alkyl such as isopropyl, isobutyl, isopentyl, isohexyl, isoheptyl, isooctyl, isononyl, isodecyl, isoundecyl, isododecyl, isotridecyl, isotetradecyl, isopentadecyl, isohexadecyl, isoheptadecyl, isooctadecyl, isononadecyl, isoicosyl, isohenicosyl, isodocosyl, isotricosyl, isotetracosyl, isopentacosyl, isohexacosyl, isoheptacosyl, isooctacosyl, isononacosyl, or isotricontyl, alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, alkyl-icosyl (including multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl), and isomers thereof where each alkyl group is independently a $C_1$ to $C_{40}$ (alternately $C_2$ to $C_{30}$, alternately $C_3$ to $C_{20}$) linear, branched or cyclic alkyl group, such as the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl.

In some embodiments, $R^1$ is methyl; $R^2$ is $C_6$-$C_{50}$ aryl which is optionally substituted with at least one of halide, $C_1$-$C_{35}$ alkyl, $C_5$-$C_5$ aryl, $C_6$-$C_{35}$ arylalkyl, and $C_6$-$C_{35}$ alkylaryl; and $R^3$ is $C_1$-$C_{40}$ branched alkyl which is optionally substituted with at least one of halide, $C_1$-$C_{35}$ alkyl, $C_5$-$C_{15}$ aryl, $C_6$-$C_{35}$ arylalkyl, and $C_6$-$C_{35}$ alkylaryl.

In any embodiment, $R^1$ is methyl, and $R^2$ is phenyl, methyl phenyl, n-butyl phenyl, n-octadecyl-phenyl, or an isomer thereof, such as $R^2$ is meta or para substituted phenyl, such as meta- or para-substituted alkyl substituted phenyl, and $R^3$ is branched alkyl.

In any embodiment, $R^1$ is methyl, and $R^2$ is branched alkyl, and $R^3$ is branched alkyl.

In some embodiments, $R^1$ is methyl, $R^2$ is substituted phenyl, $R^3$ is $C_{10}$ to $C_{30}$ branched alkyl. In at least one such embodiment, $R^2$ is not meta substituted phenyl. In at least one such embodiment, $R^2$ is not ortho substituted phenyl.

In some embodiments, $R^1$ is methyl, $R^2$ is $C_1$ to $C_{35}$ alkyl substituted phenyl (such as ortho- or meta-substituted), $R^3$ is $C_8$ to $C_{30}$ branched alkyl.

In some embodiments, $R^1$ is $C_1$ to $C_{10}$ alkyl, $R^2$ is $C_1$ to $C_{35}$ alkyl substituted phenyl (such as para substituted phenyl), $R^3$ is $C_8$ to $C_{30}$ branched alkyl.

In some embodiments, $R^1$ is methyl; $R^2$ is $C_1$ to $C_{35}$ alkyl substituted phenyl, such as methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecyl, phenyl n-dodecylphenyl, n-tridecylphenyl, n-butadecylphenyl, n-pentadecylphenyl, n-hexadecylphenyl, n-heptadecylphenyl, n-octadecylphenyl, n-nonadecylphenyl, and n-icosylphenyl, n-henicosylphenyl, n-docosylphenyl, n-tricosylphenyl, n-tetracosylphenyl, n-pentacosylphenyl, n-hexacosylphenyl, n-heptacosylphenyl, n-octacosylphenyl, n-nonacosylphenyl, n-triacontylphenyl; and $R^3$ is $C_8$ to $C_{30}$ branched alkyl, such as i-propyl, alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, and alkyl-icosyl (such as 2-alkyl-pentyl, 2-alkyl-hexyl, 2-alkyl-heptyl, 2-alkyl-octyl, 2-alkyl-nonyl, 2-alkyl-decyl, 2-alkyl-undecyl, 2-alkyl-dodecyl, 2-alkyl-tridecyl, 2-alkyl-butadecyl, 2-alkyl-pentadecyl, 2-alkyl-hexadecyl, 2-alkyl-heptadecyl, 2-alkyl-octadecyl, 2-alkyl-nonadecyl, 2-alkyl-icosyl or a multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl, etc.), or an isomer thereof where each alkyl group is independently a $C_1$ to $C_{40}$ (alternately $C_2$ to $C_{30}$, alternately $C_3$ to $C_{20}$) linear, branched or cyclic alkyl group, such as the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl.

No Branched Alkyl R Groups

In some embodiments, each of $R^1$, $R^2$, and $R^3$ is independently $C_1$-$C_{40}$ linear alkyl, $C_5$-$C_{22}$-aryl, arylalkyl (where the alkyl has from 1 to 30 (or 1 to 10) carbon atoms and the aryl has from 6 to 20 carbon atoms) or five-, six- or seven-membered heterocyclyl including at least one atom selected from N, P, O and S, where each of $R^1$ $R^2$, and $R^3$ is optionally substituted by halogen, —$NR'_2$, —OR' or —$SiR'_3$ (where each R' is independently hydrogen or $C_1$-$C_{20}$ hydrocarbyl), where $R^2$ optionally bonds with $R^5$ to independently form a five-, six- or seven-membered ring.

In at least one embodiment, $R^1$, $R^2$, and $R^3$ are independently substituted or unsubstituted $C_1$-$C_{22}$ linear alkyl, or substituted or unsubstituted phenyl.

In some embodiments, $R^1$ is an optionally substituted $C_1$-$C_{20}$ (or $C_1$ to $C_{10}$, or $C_1$-$C_6$, or $C_1$-$C_4$, or $C_1$-$C_2$, or $C_1$) linear alkyl group and each of $R^2$ and $R^3$ is independently an optionally substituted $C_1$-$C_{40}$ linear alkyl group (such as a $C_6$ to $C_{40}$ linear alkyl group, or a $C_{10}$ to $C_{30}$ linear alkyl group) or a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, an optionally substituted silyl group, a halogen (Br, Cl, I, F, etc.), or a halogen containing group (such as bromoalkyl or bromoaryl).

In at least one embodiment, each of $R^1$, $R^2$ and $R^3$ is independently selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-icosyl.

In some embodiments, $R^1$ is a methyl group, $R^2$ is $C_6$-$C_{50}$ aryl which is optionally substituted with at least one of halide, $C_1$-$C_{35}$ alkyl, $C_5$-$C_{15}$ aryl, $C_6$-$C_{35}$ arylalkyl, and $C_6$-$C_{35}$ alkylaryl, and $R^3$ is $C_1$-$C_{40}$ linear alkyl or $C_5$-$C_{42}$-aryl which is optionally substituted with at least one of halide, $C_1$-$C_{35}$ alkyl, $C_5$-$C_5$ aryl, $C_6$-$C_{35}$ arylalkyl, and $C_6$-$C_{35}$ alkylaryl, where $R^2$ optionally bonds with $R^3$ to independently form a five-, six- or seven-membered ring.

In some embodiments, $R^1$ is methyl, $R^2$ is a $C_1$ to $C_{40}$ linear alkyl group (such as a $C_6$ to $C_{40}$ linear alkyl, or $C_{10}$ to $C_{30}$ linear alkyl), and $R^3$ is a para-substituted phenyl group, where the para substituent is, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_2$ aryl group or linear alkyl group), an optionally substituted alkoxy group, an optionally substituted silyl group, a halogen, or a halogen containing group.

In some embodiments, $R^2$ is unsubstituted phenyl or substituted phenyl. In at least one embodiment, $R^2$ is phenyl, methyl phenyl, n-butyl phenyl, n-octadecyl-phenyl, or an isomer thereof, such as $R^2$ is meta or para substituted phenyl, such as meta- or para-substituted alkyl substituted phenyl. In at least one embodiment, $R^3$ is independently selected from C to $C_{30}$ linear alkyl, such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-icosyl.

In some embodiments, the meta and para substituents are, independently, an optionally substituted linear alkyl group (such as n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl, n-tetracosyl, n-pentacosyl, n-hexacosyl, n-heptacosyl, n-octacosyl, n-nonacosyl, or n-tricontyl), an optionally substituted silyl group, such as a trialkylsilyl group, where each alkyl is independently an optionally substituted $C_1$ to $C_{20}$ alkyl (such as trimethylsilyl, triethylsilyl, tripropylsilyl, tributylsilyl, trihexylsilyl, triheptylsilyl, trioctylsilyl, trinonylsilyl, tridecylsilyl, triundecylsilyl, tridodecylsilyl, tri-tridecylsilyl, tri-tetradecylsilyl, tri-pentadecylsilyl, tri-hexadecylsilyl, tri-heptadecylsilyl, tri-octadecylsilyl, tri-nonadecylsilyl, tri-icosylsilyl), or an optionally substituted alkoxy group (such as —OR*, where R* is an optionally substituted $C_1$ to $C_{20}$ alkyl or aryl (such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, phenyl, phenyl alkyl (such as methyl phenyl, propyl phenyl, etc.), naphthyl, or anthracenyl), a halogen (such as Br or $C_1$) or a halogen containing group (such as bromomethyl, bromophenyl, and the like)).

In some embodiments, the meta-substituted phenyl is methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecylphenyl, n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, n-icosylphenyl, n-henicosylphenyl, n-docosylphenyl, n-tricosylphenyl, n-tetracosylphenyl, n-pentacosylphenyl, n-hexacosylphenyl, n-heptacosylphenyl, n-octacosylphenyl, n-nonacosylphenyl, n-tricontylphenyl, dimethylphenyl, diethylphenyl, di-n-propylphenyl, di-n-butylphenyl, di-n-pentylphenyl, di-n-hexylphenyl, di-n-heptylphenyl, di-n-octylphenyl, di-n-nonylphenyl, di-n-decylphenyl, di-n-undecylphenyl, di-n-dodecylphenyl, di-n-tridecylphenyl, di-n-tetradecylphenyl, di-n-pentadecylphenyl, di-n-hexadecylphenyl, di-n-heptadecylphenyl, di-n-octadecylphenyl, di-n-nonadecylphenyl, di-n-icosylphenyl, di-n-henicosylphenyl, di-n-docosylphenyl, di-n-tricosylphenyl, di-n-tetracosylphenyl, di-n-pentacosylphenyl, di-n-hexacosylphenyl, di-n-heptacosylphenyl, di-n-octacosylphenyl, di-n-nonacosylphenyl, and di-n-tricontylphenyl. The two meta substituents may be the same or different.

In some embodiments, the para-substituted phenyl is methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecylphenyl, n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, n-icosylphenyl, n-henicosylphenyl, n-docosylphenyl, n-tricosylphenyl, n-tetracosylphenyl, n-pentacosylphenyl, n-hexacosylphenyl, n-heptacosylphenyl, n-octacosylphenyl, n-nonacosylphenyl, or n-tricontylphenyl.

In some embodiments, $R^1$ is methyl, $R^2$ is n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, or n-icosyl, and $R^3$ is methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecylphenyl, n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, or n-icosylphenyl.

In at least one embodiment, each of $R^2$ and $R^3$ is independently selected from methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecylphenyl, n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, and n-icosylphenyl.

In at least one embodiment, $R^1$ is methyl, $R^2$ is substituted phenyl, and $R^3$ is $C_{10}$ to $C_{30}$ linear alkyl. In some embodiments, $R^2$ is not meta substituted phenyl.

In at least one embodiment, $R^1$ is methyl, $R^2$ is $C_1$ to $C_{35}$ alkyl substituted phenyl (such as ortho- or meta-substituted), $R^3$ is $C_{10}$ to $C_{30}$ linear alkyl.

In at least one embodiment, $R^1$ is methyl, $R^2$ is $C_1$ to $C_{35}$ alkyl substituted phenyl (such as para substituted), and $R^3$ is $C_{10}$ to $C_{30}$ linear alkyl.

In at least one embodiment, $R^1$ is methyl; $R^2$ is $C_1$ to $C_{35}$ alkyl substituted phenyl, such as methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecyl, phenyl n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, and n-icosylphenyl, n-henicosylphenyl, n-docosylphenyl, n-tricosylphenyl, n-tetracosylphenyl, n-pentacosylphenyl, n-hexacosylphenyl, n-heptacosylphenyl, n-octacosylphenyl, n-nonacosylphenyl, n-triacontylphenyl; and $R^3$ is $C_{10}$ to $C_{30}$ linear alkyl, such as n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl; n-tetracosyl, n-pentacosyl; n-hexacosyl; n-heptacosyl, n-octacosyl, n-nonacosyl, n-triacontyl.

In at least one embodiment, $R^2$ is $C_1$ to $C_{35}$ alkyl substituted phenyl, such as methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecyl, phenyl n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, and n-icosylphenyl, n-henicosylphenyl, n-docosylphenyl, n-tricosylphenyl, n-tetracosylphenyl, n-pentacosylphenyl, n-hexacosylphenyl, n-heptacosylphenyl, n-octacosylphenyl, n-nonacosylphenyl, n-triacontylphenyl; and $R^3$ is $C_{10}$ to $C_{30}$ linear alkyl, such as n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl; n-tetracosyl, n-pentacosyl; n-hexacosyl; n-heptacosyl, n-octacosyl, n-nonacosyl, n-triacontyl.

In at least one embodiment of formula (I), $R^1$ is methyl, $R^2$ is substituted phenyl, $R^3$ is $C_{10}$ to $C_{30}$ linear alkyl, and $R^4$, $R^5$, $R^6$, $R^7$ are perfluoronaphthyl.

In at least one embodiment of formula (AI), $R^1$ is methyl, $R^2$ is substituted phenyl, $R^3$ is $C_{10}$ to $C_{30}$ linear alkyl, E is nitrogen, and each Q is perfluoronaphthyl.

In at least one embodiment, $R^1$ is methyl; $R^2$ is $C_1$ to $C_{35}$ alkyl substituted phenyl, such as methylphenyl, ethylphenyl, n-propylphenyl, n-butylphenyl, n-pentylphenyl, n-hexylphenyl, n-heptylphenyl, n-octylphenyl, n-nonylphenyl, n-decylphenyl, n-undecyl, phenyl n-dodecylphenyl, n-tridecylphenyl, n-tetradecylphenyl, n-pentadecylphenyl, n-hexadecylphenyl, n-heptadecylphenyl, n-octadecylphenyl, n-nonadecylphenyl, and n-icosylphenyl, n-henicosylphenyl, n-docosylphenyl, n-tricosylphenyl, n-tetracosylphenyl, n-pentacosylphenyl, n-hexacosylphenyl, n-heptacosylphenyl, n-octacosylphenyl, n-nonacosylphenyl, n-triacontylphenyl; $R^3$ is $C_{10}$ to $C_{30}$ linear alkyl, such as n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl; n-tetracosyl, n-pentacosyl; n-hexacosyl; n-heptacosyl, n-octacosyl, n-nonacosyl, n-triacontyl; and each Q or each of $R^4$, $R^5$, $R^6$, $R^7$ are perfluoronaphthyl.

In at least one embodiment, $R^1$ is o-MePh, $R^2$ and $R^3$ are n-octadecyl.

In at least one embodiment, $R^1$ is m-MePh, $R^2$ and $R^3$ are n-octadecyl.

In at least one embodiment, $R^1$ is not para-alkylphenyl, such as p-MePh.

In at least one embodiment, $R^1$ is Me, $R^2$ is n-octadecylaryl, and $R^3$ is n-octadecyl.

In at least one embodiment, $R^1$ is Me, $R^2$ is n-octadecylphenyl, and $R^3$ is n-octadecyl.

In at least one embodiment, $R^1$ is Me, $R^2$ is n-butylaryl, and $R^3$ is n-octadecyl.

In at least one embodiment, $R^1$ is Me, $R^2$ is n-butylphenyl, and $R^3$ is n-octadecyl.

In at least one embodiment, $R^1$ is n-decyl, $R^2$ is n-butylaryl, and $R^3$ is n-decyl.

In at least one embodiment, $R^1$ is n-decyl, $R^2$ is n-butylphenyl, and $R^3$ is n-decyl.

In at least one embodiment, $R^1$ is n-propyl, $R^2$ is p-methylphenyl, and $R^3$ is n-octadecyl.

In at least one embodiment, the cation is selected from the group consisting of:

| | |
|---|---|
| 1 | 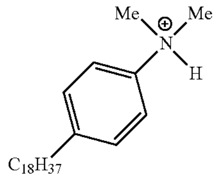 |
| 2 | 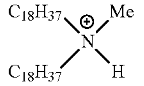 |
| 3 | 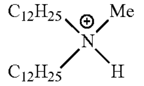 |
| 4 | 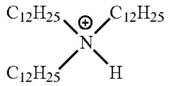 |
| 5 | 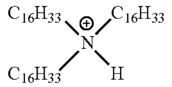 |
| 6 | 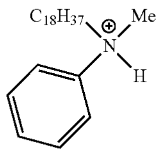 |
| 7 | 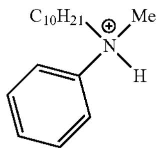 |

-continued
8
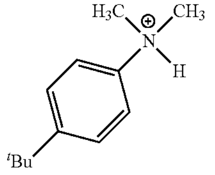
9
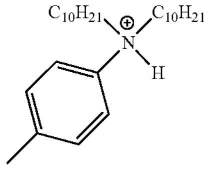
10
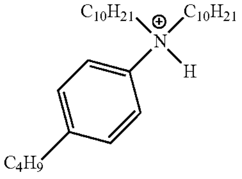
11
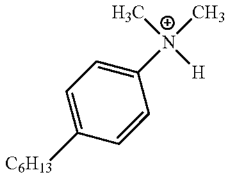
12
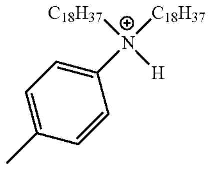
13
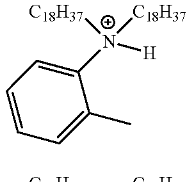
14
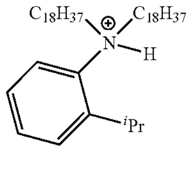
15
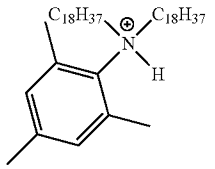
16
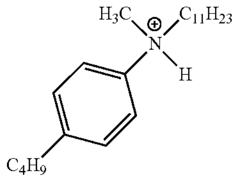
-continued
17
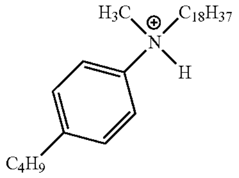
18
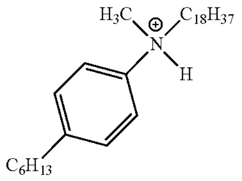
19
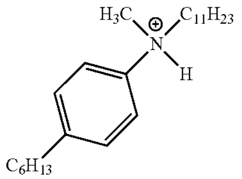
20
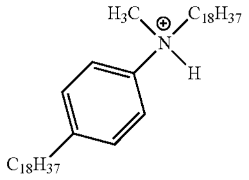
21
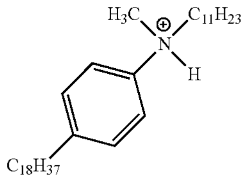
22
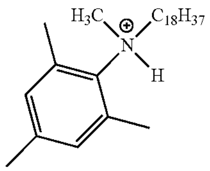
23
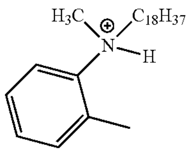
24
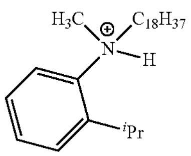
25
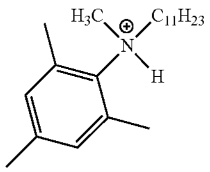

-continued

26

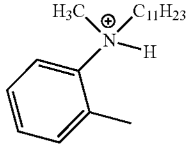

27

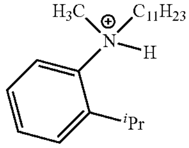

29

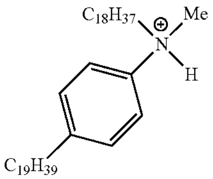

28

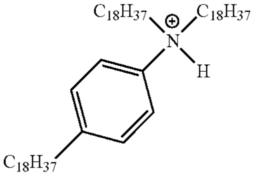

30

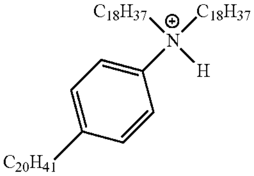

31

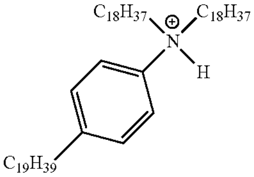

32

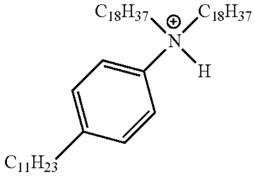

33

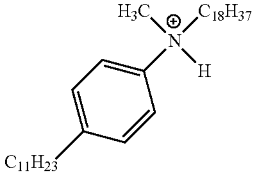

In at least one embodiment, $R^1$ is a methyl group; $R^2$ is $C_6$-$C_{40}$ aryl (such as substituted phenyl) and $R^3$ is independently $C_1$-$C_{35}$ linear alkyl, $C_5$-$C_{40}$-aryl, where each of $R^2$ and $R^3$ is independently unsubstituted or substituted with at least one of $C_1$-$C_{35}$alkyl, $C_5$-$C_{30}$ aryl, $C_6$-$C_{305}$ arylalkyl, $C_6$-$C_{30}$ alkylaryl, halogen, where $R^2$ optionally bonds with $R^3$ to independently form a five-, six- or seven-membered ring, where $R^2$, and $R^3$ together include 20 or more carbon atoms; and optionally $R^1$, $R^2$, and $R^3$ together include 21 or more carbon atoms, such as 22 or more carbon atoms, such as 25 or more carbon atoms, such as 30 or more carbon atoms, such as 35 or more carbon atoms, such as 40 or more carbon atoms. In at least one embodiment, $R^2$ is independently substituted $C_1$-$C_{22}$-alkyl, unsubstituted phenyl, or substituted phenyl. In at least one embodiment, $R^3$ is independently selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-icosyl.

In some embodiments, the cation is selected from the group consisting of:

16

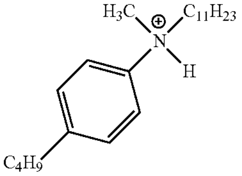

17

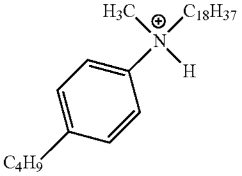

18

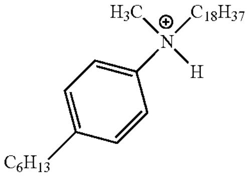

19

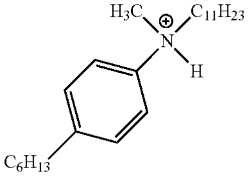

20

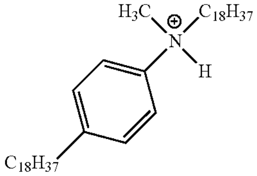

21

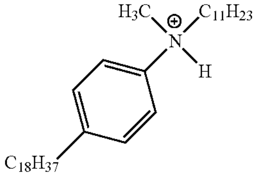

-continued

22
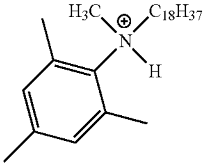

23
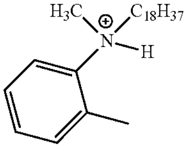

24
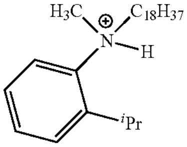

25
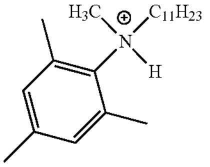

26
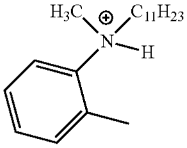

27
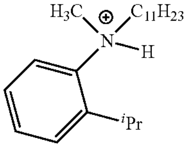

29
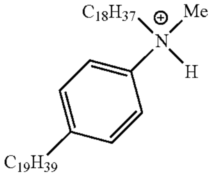

28
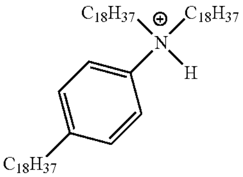

30
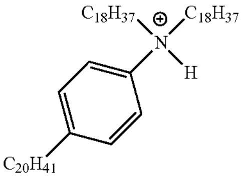

-continued

31
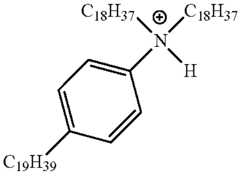

32
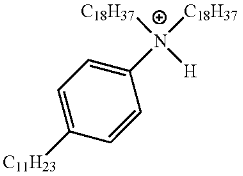

33
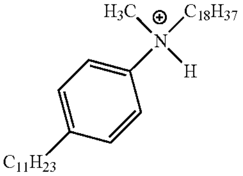

In some embodiments, the compound represented by formulas (A) and (I) includes a cation selected from the group consisting of:

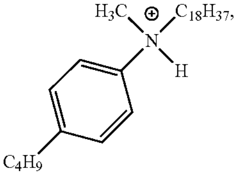

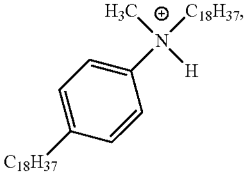

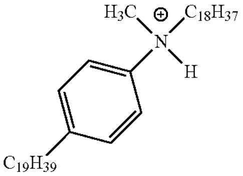

and

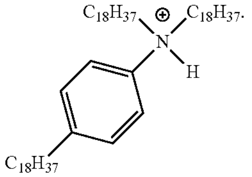

In some embodiments, $R^1$ is not methyl, $R^2$ is not $C_{18}$ alkyl and $R^3$ is not $C_{18}$ alkyl, alternately $R^1$ is not methyl, $R^2$ is not $C_{18}$ alkyl and $R^3$ is not $C_{18}$ alkyl and at least one Q is not substituted phenyl, such as all Q are not substituted phenyl.

Activators—The Anion

Suitable activators for use in the systems and processes of the present disclosure are non-coordinating anion (NCA) activators. Non-coordinating anions useful in accordance with the present disclosure are those that are compatible, stabilize the transition metal cation in the sense of balancing its ionic charge at +1, and yet retain sufficient lability to permit displacement during polymerization. Suitable ionizing activators may include an NCA, such as a compatible NCA.

An NCA may include "bulky activators" where the anion is represented by the formula:

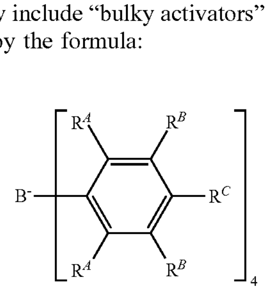

where:

each $R^A$ is independently a halide, such as a fluoride;

each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);

each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a C perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);

where the anion has a molecular weight of greater than 1,020 g/mol; and where at least three of the substituents on the B atom each have a molecular volume of greater than 250 cubic Å, alternately greater than 300 cubic Å, or alternately greater than 500 cubic Å.

"Molecular volume" is used as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964, which is incorporated by reference. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of suitable non-coordinating anions please see U.S. Pat. No. 8,658,556, incorporated by reference.

The anion component of the activators includes those represented by the formula $[M^{k+}Q_n]^-$ where k is 1, 2, or 3; n is 1, 2, 3, 4, 5, or 6 (such as 1, 2, 3, or 4); M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 30 carbon atoms.

In some embodiments, each Q is a fluorinated hydrocarbyl group, optionally having 1 to 30 carbon atoms, such as where each Q is a fluorinated aryl group, such as where each Q is a perfluorinated aryl group. In at least one embodiment, at least one Q is not substituted phenyl, such as perfluorophenyl, such as all Q are not substituted phenyl, such as perfluorophenyl.

In some embodiments, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical. In some embodiments, each Q is a fluorinated hydrocarbyl group having 1 to 30 carbon atoms, such as each Q is a fluorinated aryl (such as phenyl or naphthyl) group, a perflourinated aryl (such as phenyl or naphthyl) group. Examples of suitable $[M^{k+}Q_n]^{d-}$ also include diboron compounds as disclosed in U.S. Pat. No. 5,447,895, incorporated by reference.

In some embodiments, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^2$ is not a $C_1$-$C_{40}$ linear alkyl group, such as $R^2$ is not an optionally substituted $C_1$-$C_{40}$ linear alkyl group (alternately when Q is a substituted phenyl group, then $R^2$ is not a $C_1$-$C_{40}$ linear alkyl group, such as $R^2$ is not an optionally substituted $C_1$-$C_{40}$ linear alkyl group). In some embodiments, when Q is a fluorophenyl group (alternately when Q is a substituted phenyl group), then $R^2$ is a meta- and/or para-substituted phenyl group, where the meta and para substituents are, independently, an optionally substituted $C_1$-$C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. In some embodiments, each Q is a fluorinated hydrocarbyl group having 1 to 30 carbon atoms, such as each Q is a fluorinated aryl (such as phenyl or naphthyl) group, or such as each Q is a perflourinated aryl (such as phenyl or naphthyl) group.

In some embodiments, the $[M^{k+}Q_n]^{d-}$ anion is a borate anion of formula $[BR^4R^5R^6R^7]^-$.

In some embodiments, each of $R^4$, $R^5$, $R^6$, and $R^7$ is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, such as, each of $R^4$, $R^5$, $R^6$, and $R^7$ is independently a fluorinated hydrocarbyl group having 1 to 30 carbon atoms, and each Q is a fluorinated aryl (such as phenyl or naphthyl) group (substituted with from one to seven fluorine atoms), or perflourinated aryl (such as phenyl or naphthyl) group.

In some embodiments, each of $R^4$, $R^5$, $R^6$, and $R^7$ is independently a fluorinated hydrocarbyl group having 1 to 30 carbon atoms, such as each of $R^4$, $R^5$, $R^6$, and $R^7$ is independently a fluorinated aryl (such as phenyl biphenyl, $[(C_6H_3(C_6H_5)_2)_4B]$, or naphthyl) group. In some embodiments, each of $R^4$, $R^5$, $R^6$, and $R^7$ is independently a perflourinated aryl (such as phenyl biphenyl, $[(C_6H_3(C_6H_5)_2)_4B]$, or naphthyl) group, where at least one of $R^4$, $R^5$, $R^6$, and $R^7$ is substituted with from one to seven fluorine atoms. In at least one embodiment, each of $R^4$, $R^5$, $R^6$, and $R^7$ is independently aryl (such as naphthyl), where at least one of $R^4$, $R^5$, $R^6$, and $R^7$ is substituted with from one to seven fluorine atoms. In any embodiment, all of $R^4$, $R^5$, $R^6$, and $R^7$ are naphthyl, where at least one, two, three, or four of $R^4$, $R^5$, $R^6$, and $R^7$ is/are substituted with one, two, three, four, five, six or seven fluorine atoms. In at least one embodiment, each of $R^4$, $R^5$, $R^6$, and $R^7$ is naphthyl, where at least one of $R^4$, $R^5$, $R^6$, and $R^7$ is substituted with from one to seven fluorine atoms.

In any embodiment, each of $R^4$, $R^5$, $R^6$, and $R^7$ is independently phenyl, where at least one of $R^4$, $R^5$, $R^6$, and $R^7$ is phenyl substituted with one, two, three, four, or five fluorine atoms. In some embodiments, at least one $R^4$, $R^5$, $R^6$, and $R^7$ is not substituted phenyl, such as all of $R^4$, $R^5$, $R^6$, and $R^7$ are not substituted phenyl.

In some embodiments, all Q or all of $R^4$, $R^5$, $R^6$, and $R^7$ are not perfluoroaryl, such as perfluorophenyl.

In at least one embodiment, $R^4$ is independently naphthyl including one fluorine atom, two fluorine atoms, three fluorine atoms, four fluorine atoms, five fluorine atoms, six fluorine atoms, or seven fluorine atoms.

In at least one embodiment, $R^4$ is independently naphthyl including one fluorine atom, two fluorine atoms, three fluorine atoms, four fluorine atoms, five fluorine atoms, six fluorine atoms, or seven fluorine atoms, and each of $R^5$, $R^6$, and $R^7$ is independently phenyl including one fluorine atom, two fluorine atoms, three fluorine atoms, four fluorine atoms, or five fluorine atoms or naphthyl including one fluorine atom, two fluorine atoms, three fluorine atoms, four fluorine atoms, five fluorine atoms, six fluorine atoms, or seven fluorine atoms.

In some embodiments, when $R^1$ is methyl, $R^2$ is C18 and $R^3$ is C18, then each of $R^4$, $R^5$, $R^6$, and $R^7$ is not perfluorophenyl.

In at least one embodiment, the borate activator includes tetrakis(heptafluoronaphth-2-yl)borate.

In some embodiments, anions for use in the non-coordinating anion activators include those represented by:

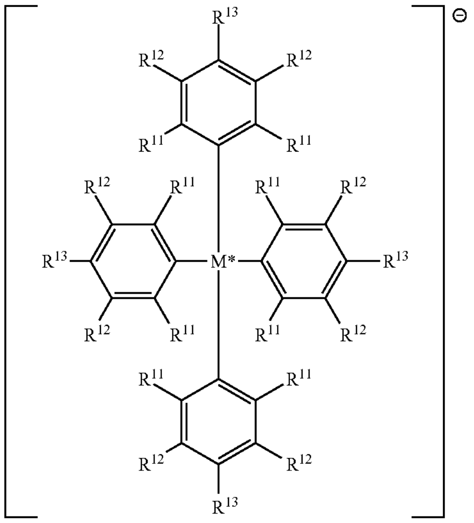

where:

M* is a group 13 atom, such as B or Al, such as B;

each $R^{11}$ is, independently, a halide, such as a fluoride;

each $R^{12}$ is, independently, a halide, a $C_6$ to $C_{20}$ substituted aromatic hydrocarbyl group, such as $R^{12}$ is a fluoride or a perfluorinated phenyl group, or a siloxy group of the formula —O—Si—$R^a$, where $R^a$ is a $C_1$ to $C_{20}$ hydrocarbyl or hydrocarbylsilyl group;

each $R^{13}$ is a halide, a $C_6$ to $C_{20}$ substituted aromatic hydrocarbyl group, such as where $R^{13}$ is a fluoride or a $C_6$ perfluorinated aromatic hydrocarbyl group, or a siloxy group of the formula —O—Si—$R^a$, where $R^a$ is a $C_1$ to $C_{20}$ hydrocarbyl or hydrocarbylsilyl group; where $R^{12}$ and $R^{13}$ can form one or more saturated or unsaturated, substituted or unsubstituted rings, such as where $R^{12}$ and $R^{13}$ form a perfluorinated phenyl ring. In some embodiments, the anion has a molecular weight of greater than 700 g/mol, and at least three of the substituents on the M* atom each have a molecular volume of greater than 180 cubic Å.

The calculated total molecular volume (MV) of the anion is the sum of the MV per substituent, for example, the MV of perfluorophenyl is 183 Å$^3$, and the calculated total MV for tetrakis(perfluorophenyl)borate is four times 183 Å$^3$, or 732 Å$^3$.

Exemplary suitable anions and their respective scaled volumes and molecular volumes are shown in Table 2 below. The dashed bonds indicate bonding to boron.

TABLE 2

| Ion | Structure of Boron Substituents | Molecular Formula of Each Substituent | $V_S$ | MV Per subst. (Å$^3$) | Calculated Total MV (Å$^3$) |
|---|---|---|---|---|---|
| tetrakis(perfluorophenyl) borate | 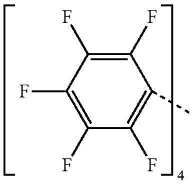 | $C_6F_5$ | 22 | 183 | 732 |

TABLE 2-continued

| Ion | Structure of Boron Substituents | Molecular Formula of Each Substituent | $V_S$ | MV Per subst. ($Å^3$) | Calculated Total MV ($Å^3$) |
|---|---|---|---|---|---|
| tris(perfluorophenyl)-(perfluoronaphthyl)borate | 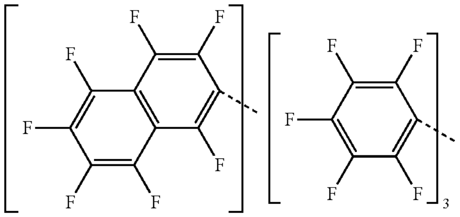 | $C_6F_5$<br>$C_{10}F_7$ | 22<br>34 | 183<br>261 | 810 |
| (perfluorophenyl)tris-(perfluoronaphthyl)borate | 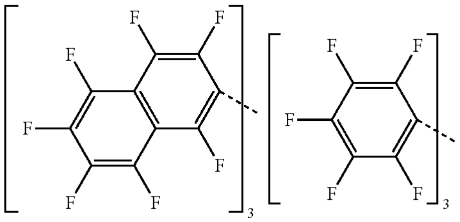 | $C_6F_5$<br>$C_{10}F_7$ | 22<br>34 | 183<br>261 | 966 |
| tetrakis(perfluoronaphthyl) borate | 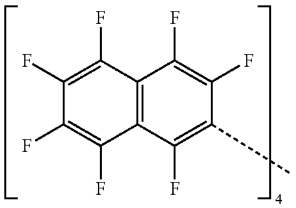 | $C_{10}F_7$ | 34 | 261 | 1044 |
| tetrakis(perfluorobiphenyl) borate | 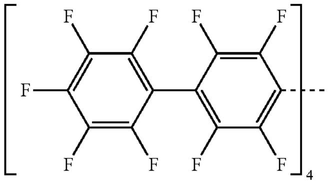 | $C_{12}F_9$ | 42 | 349 | 1396 |
| $[(C_6F_3(C_6F_5)_2)_4B]$ | 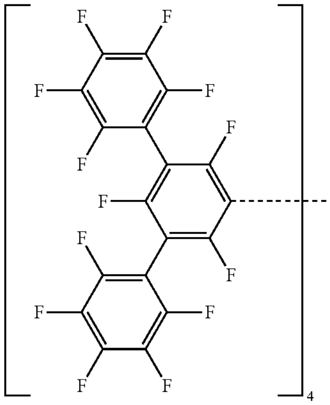 | $C_{18}F_{13}$ | 62 | 515 | 2060 |

The activators may be added to a polymerization in the form of an ion pair using, for example, [M2HTH]+[NCA]− in which the di(hydrogenated tallow)methylamine ("M2HTH") cation or [DEBAH]+[NCA]− in which the 4-butyl-N,N-bis(isotridecyl)benzenaminium-("DEBAH") cation reacts with a basic leaving group on the transition metal complex to form a transition metal complex cation and [NCA]−. Alternatively, the transition metal complex may be reacted with a neutral NCA precursor, such as $B(C_{10}F_7)_3$, which abstracts an anionic group from the complex to form an activated species.

In at least one embodiment, the activators obtained in their salt form used for a borate activator compound are: Lithium tetrakis(heptafluoronaphthalen-2-yl)borate etherate (Li-BF28), N,N-Dimethylanilinium tetrakis(heptafluoronaphthalen-2-yl)borate (DMAH-BF28), Sodium tetrakis (heptafluoronaphthalen-2-yl)borate (Na-BF28) and N,N-dimethylaniliniumtetrakis(heptafluoronaphthalen-2-yl)borate (DMAH-BF28).

In at least one embodiment, an activator of the present disclosure, when combined with a group 4 metallocene catalyst compound to form an active olefin polymerization catalyst, produces a higher molecular weight polymer (e.g., Mw) than comparative activators that use other borate anions.

In at least one embodiment, an activator of the present disclosure where $R^1$ is methyl, when combined with a group 4 metallocene to form an active olefin polymerization catalyst, produces a higher molecular weight polymer (e.g., Mw) than comparative activators that use other borate anions.

The typical activator-to-catalyst ratio, e.g., all NCA activators-to-catalyst ratio is about a 1:1 molar ratio. In some embodiments, NCA activators to catalyst ratios may include from 0.1:1 to 100:1, from 0.5:1 to 200:1, from 1:1 to 500:1, or from 1:1 to 1000:1, such as from 0.5:1 to 10:1, or 1:1 to 5:1.

It is also within the scope of the present disclosure that the catalyst compounds can be combined with combinations of alumoxanes and the activators.

Optional Scavengers or Co-Activators

In addition to these activator compounds, scavengers or co-activators may be introduced to the polymerization reactor in the systems and processes of the present disclosure. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

In at least one embodiment, little or no scavenger is introduced to the polymerization reactor. Scavenger (such as trialkyl aluminum) can be present at 0 mol %, alternately the scavenger is present at a molar ratio of scavenger metal to transition metal of less than 100:1, such as less than 50:1, such as less than 15:1, such as less than 10:1.

Catalyst Compounds

Catalyst systems of the present disclosure may be formed by combining the catalysts with activators, including supporting the catalyst systems for use in slurry or gas phase polymerization. The catalyst systems may also be added to or generated in solution polymerization or bulk polymerization (in the monomer, i.e., little or no solvent).

A transition metal compound capable of catalyzing a reaction, such as a polymerization reaction, upon activation with an activator as described above is suitable for use in polymerization reactor of the present disclosure. Transition metal compounds known as metallocenes are exemplary catalyst compounds according to the present disclosure.

In at least one embodiment, the present disclosure provides a catalyst system including a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can be from 0 to +7, for example +1, +2, +3, +4, or +5, such as +2, +3, or +4.

Metallocene Catalyst Compounds

A “metallocene” catalyst compound is a transition metal catalyst compound having one, two or three, typically one or two, substituted or unsubstituted cyclopentadienyl ligands (such as substituted or unsubstituted Cp, Ind or Flu) bound to the transition metal. Metallocene catalyst compounds include metallocenes including Group 3 to Group 12 metal complexes, such as, Group 4 to Group 6 metal complexes, for example, Group 4 metal complexes. The metallocene catalyst compound of catalyst systems of the present disclosure may be unbridged metallocene catalyst compounds represented by the formula: $Cp^ACp^BM'X'_n$, where each $Cp^A$ and $Cp^B$ is independently selected from cyclopentadienyl ligands (for example, Cp, Ind, or Flu) and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms; X' is an anionic leaving group; n is 0 or an integer from 1 to 4; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, indacenyl, tetrahydroindenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof. Each $Cp^A$ and $Cp^B$ may independently be indacenyl or tetrahydroindenyl.

The metallocene catalyst compound may be a bridged metallocene catalyst compound represented by the formula: $Cp^A(T)Cp^BM'X'_n$, where each $Cp^A$ and $Cp^B$ is independently selected from cyclopentadienyl ligands (for example, Cp, Ind, or Flu) and ligands isolobal to cyclopentadienyl, where one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms, such as Group 4; X' is an anionic leaving group; n is 0 or an integer from 1 to 4; (T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated, and substituted versions thereof, such as cyclopentadienyl, n-propylcyclopentadienyl, indenyl, pentamethylcyclopentadienyl, tetramethylcyclopentadienyl, and n-butylcyclopentadienyl. Each $Cp^A$ and $Cp^B$ may independently be indacenyl or tetrahydroindenyl.

(T) is a bridging group containing at least one Group 13, 14, 15, or 16 element, in particular boron or a Group 14, 15 or 16 element, such as where (T) is 0, S, NR', or $SiR'_2$, where each R' is independently hydrogen or $C_1$-$C_2$ hydrocarbyl.

In another embodiment, the metallocene catalyst compound is represented by the formula:

$$T_yCp_mMG_nX_q$$

where Cp is independently a substituted or unsubstituted cyclopentadienyl ligand (for example, substituted or unsubstituted Cp, Ind, or Flu) or substituted or unsubstituted ligand isolobal to cyclopentadienyl; M is a Group 4 transition metal; G is a heteroatom group represented by the formula $JR^*_z$ where J is N, P, O or S, and R* is a linear, branched, or cyclic $C_1$-$C_{20}$ hydrocarbyl; z is 1 or 2; T is a bridging group; y is 0 or 1; X is a leaving group; m=1, n=1, 2 or 3, q=0, 1, 2 or 3, and the sum of m+n+q is equal to the coordination number of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

In at least one embodiment, the catalyst compound is represented by formula (II) or formula (III):

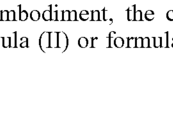

(II)

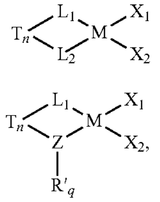

(III)

where in each of formula (II) and formula (III):

M is the metal center, and is a Group 4 metal, such as titanium, zirconium or hafnium, such as zirconium or hafnium when $L_1$ and $L_2$ are present and titanium when Z is present;

n is 0 or 1;

T is an optional bridging group which, if present, is a bridging group containing at least one Group 13, 14, 15, or 16 element, in particular boron or a Group 14, 15 or 16 element (such as where T is selected from dialkylsilyl, diarylsilyl, dialkylnethyl, ethylenyl (—$CH_2$—$CH_2$—) or hydrocarbylethylenyl where one, two, three or four of the hydrogen atoms in ethylenyl are substituted by hydrocarbyl, where hydrocarbyl can be independently $C_1$ to $C_{16}$ alkyl or phenyl, tolyl, xylyl and the like), and when T is present, the catalyst represented can be in a racemic or a meso form;

$L_1$ and $L_2$ are independently cyclopentadienyl, indenyl, tetrahydroindenyl or fluorenyl, optionally substituted, that are each bonded to M, or $L_1$ and $L_2$ are independently cyclopentadienyl, indenyl, tetrahydroindenyl or fluorenyl, which are optionally substituted, in which two adjacent substituents on $L^1$ and $L^2$ are optionally joined to form a substituted or unsubstituted, saturated, partially unsaturated, or aromatic cyclic or polycyclic substituent;

Z is nitrogen, oxygen, sulfur, or phosphorus (such as nitrogen):

q is 1 or 2 (such as where q is 1 when Z is N);

R' is a cyclic, linear or branched $C_1$ to $C_4$ alkyl or substituted alkyl group;

$X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted gernylcarbyl radicals; or $X_1$ and $X_2$ are joined and bound to the metal atom to form a metallacycle ring containing from about 3 to about 20 carbon atoms; or both together can be an olefin, diolefin or aryne ligand.

In some embodiments, T is present and is a bridging group containing at least one element from Group 13, 14, 15, or 16 of the periodic table of the elements, in particular a Group 14 element. Examples of suitable bridging groups include P(=S)R', P(=Se)R', P(=O)R', $R'_2C$, $R'_2Si$, $R'_2Ge$, $R'_2CCR'_2$, $R'_2CCR'_2CR'_2$, $R'_2CCR'_2CR'_2CR'_2$, R'C=CR', R'C=CR'$CR'_2$, $R'_2$CCR'=CR'$CR'_2$, R'C=CR'CR'=CR', R'C=CR'$CR'_2CR'_2$, $R'_2CSiR'_2$, $R'_2SiSiR'_2$, $R'_2SiOSiR'_2$, $R'_2CSiR'_2CR'_2$, $R'_2SiCR'_2SiR'_2$, R'C=CR'$SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, R'C=CR'$GeR'_2$, R'B, $R'_2$C—BR', $R'_2$C—BR'—$CR'_2$, $R'_2$C—O—$CR'_2$, $R'_2CR'_2$C—O—$CR'_2CR'_2$, $R'_2$C—O—$CR'_2CR'_2$, $R'_2$C—O—CR'=CR', $R'_2$C—S—$CR'_2$, $R'_2CR'_2$C—S—$CR'_2CR'_2$, $R'_2$C—S—$CR'_2CR'_2$, $R'_2$C—S—CR'=CR', $R'_2$C—Se—$CR'_2$, $R'_2CR'_2$C—Se—$CR'_2CR'_2$, $R'_2$C—Se—$CR'_2CR'_2$, $R'_2$C—Se—CR'=CR', $R'_2$C—N=CR', $R'_2$C—NR'—$CR'_2$, $R'_2$C—NR'—$CR'_2CR'_2$, $R'_2$C—NR'—CR'=CR', $R'_2CR'_2$C—NR'—$CR'_2CR'_2$, $R'_2$C—P=CR', $R'_2$C—PR'—$CR'_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Examples for the bridging group T include $CH_2$, $CH_2CH_2$, $SiMe_2$, $SiPh_2$, SiMePh, $Si(CH_2)_3$, $Si(CH_2)_4$, O, S, NPh, PPh, NMe, PMe, NEt, NPr, NBu, PEt, PPr, $Me_2SiOSiMe_2$, and PBu.

In some embodiments of formulas of the present disclosure, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic or fused ring system. In some embodiments, T is a bridging group including carbon or silica, such as dialkylsilyl, such as where T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, $Me_2SiOSiMe_2$, and cyclopentasilylene ($Si(CH_2)_4$).

In at least one embodiment, the catalyst compound has a symmetry that is C2 symmetrical.

The metallocene catalyst component may include a combination of two or more "embodiments" of the present disclosure.

Suitable metallocenes include, but are not limited to, the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; US Patent publication 2007/0055028, and published PCT Applications WO 97/22635; WO 00/699/22; WO 01/30860; WO 01/30861; WO 02/46246; WO 02/50088; WO 04/026921; and WO 06/019494, all incorporated by reference. Additional suitable catalysts include those referenced in U.S. Pat. Nos. 6,309,997; 6,265,338; US Patent publication 2006/019925, and the following articles: Resconi, L. et al. (2000) "Selectivity in Propene Polymerization with Metallocene Catalysts," *Chem. Rev.*, v. 100(4), pp. 1253-1346; Gibson, V. C. et al. (2003) "Advances in Non-Metallocene Olefin Polymerization Catalysis," *Chem. Rev.*, v. 103(1), pp. 283-316; Nakayama, Y. et al. (2006) "$MgCl_2/R'_nAl(OR)_{3-n}$: An Excellent Activator/Support for Transition-Metal Complexes for Olefin Polymerization," *Chem. Eur. J.*, v. 12, pp. 7546-7556; Nakayama, Y et al. (2004), "Olefin Polymerization Behavior of bis(phenoxy-imine) Zr, Ti, and V complexes with $MgCl_2$-based Cocatalysts," *J. Mol. Catalysis A: Chemical*, v. 213, pp. 141-150; Nakayama, Y. et al. (2005), Propylene Polymerization Behavior of Fluorinated Bis(phenoxy-imine) Ti Complexes with an $MgCl_2$—Based Compound ($MgCl_2$—Supported Ti-Based Catalysts)," *Macromol. Chem. Phys.*, v. 206(18), pp. 1847-1852; and Matsui, S. et al. (2001) "A Family of Zirconium Complexes Having Two Phenoxy-Imine Chelate Ligands for Olefin Polymerization," *J. Am. Chem. Soc.*, v. 123(28), pp. 6847-6856.

Exemplary metallocene compounds include:

bis(cyclopentadienyl)zirconium dichloride,
bis(n-butylcyclopentadienyl)zirconium dichloride,
bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride, and
(n-propyl cyclopentadienyl, pentamethyl cyclopentadienyl) zirconium dimethyl.

In at least one embodiment, the catalyst compound may be selected from:

dimethylsilylbis(tetrahydroindenyl)$MX_n$,
dimethylsilylbis(2-methylindenyl)$MX_n$,
dimethylsilylbis(2-methylfluorenyl)$MX_n$,
dimethylsilylbis(2-methyl-5,7-propylindenyl)$MX_n$,
dimethylsilylbis(2-methyl-4-phenylindenyl)$MX_n$,
dimethylsilylbis(2-ethyl-5-phenylindenyl)$MX_n$,
dimethylsilylbis(2-methyl-4-biphenylindenyl)$MX_n$,
dimethylsilylenebis(2-methyl-4-carbazolylindenyl)$MX_n$,
rac-dimethylsilyl-bis-(5,6,7,8-tetrahydro-5,5,8,8-tetramethyl-2-methyl-1H-benz(f)indene)$MX_n$,
diphenylmethylene (cyclopentadienyl)(fluorenyl)$MX_n$,
bis(methylcyclopentadienyl)$MX_n$,
rac-dimethylsilylbis(2-methyl, 3-propyl indenyl)$MX_n$,
dimethylsilylbis(indenyl)$MX_n$,
Rac-meso-diphenylsilyl-bis(n-propylcyclopentadienyl) $MX_n$,
1,1'-bis(4-triethylsilylphenyl)methylene-(cyclopentadienyl)(3,8-di-tertiary-butyl-1-fluorenyl)$MX_n$ (bridge is considered the 1 position),
bis-trimethylsilylphenyl-methylene(cyclopentadienyl)(di-t-butylfluorenyl)MXn,
bis-trimethylsilylphenyl-methylene(cyclopentadienyl)(fluorenyl)MXn,
bisphenylmethylene(cyclopentadienyl)(dimethylfluorenyl) MXn,
bis(n-propylcyclopentadienyl)$MX_n$,
bis(n-butylcyclopentadienyl)$MX_n$,
bis(n-pentylcyclopentadienyl)$MX_n$,
(n-propyl cyclopentadienyl)(n-butylcyclopentadienyl)$MX_n$,
bis[(2-trimethylsilylethyl)cyclopentadienyl]$MX_n$,
bis(trimethylsilyl cyclopentadienyl)$MX_n$,
dimethylsilylbis(n-propylcyclopentadienyl)$MX_n$,
dimethylsilylbis(n-butylcyclopentadienyl)$MX_n$,
bis(1-n-propyl-2-methylcyclopentadienyl)$MX_n$,
(n-propylcyclopentadienyl)(1-n-propyl-3-n-butylcyclopentadienyl)$MX_n$,
bis(1-methyl, 3-n-butyl cyclopentadienyl)$MX_n$,
bis(indenyl)$MX_n$,
dimethylsilyl (tetramethylcyclopentadienyl)(cyclododecylamido)$MX_n$,
dimethylsilyl (tetramethylcyclopentadienyl)(t-butylamido) $MX_n$,
μ-$(CH_3)_2$Si(cyclopentadienyl)(1-adamantylamido)$MX_n$,
μ-$(CH_3)_2$Si(3-tertbutylcyclopentadienyl)(1-adamantylamido)$MX_n$,
μ-$(CH_3)_2$(tetramethylcyclopentadienyl)(1-adamantylamido) $MX_n$,
μ-$(CH_3)_2$Si(tetramethylcyclopentadienyl)(1-adamantylamido)$MX_n$,
μ-$(CH_3)_2$C(tetramethylcyclopentadienyl)(1-adamantylamido)$MX_n$,
μ-$(CH_3)_2$Si(tetramethylcyclopentadienyl)(1-tertbutylamido) $MX_n$,
μ-$(CH_3)_2$Si(fluorenyl)(1-tertbutylamido)$MX_n$,
μ-$(CH_3)_2$Si(tetramethylcyclopentadienyl)(1-cyclododecylamido)$MX_n$,
μ-$(C_6H_5)_2$C(tetramethylcyclopentadienyl)(1-cyclododecylamido)$MX_n$,
μ-$(CH_3)_2$Si($\eta^5$-2,6,6-trimethyl-1,5,6,7-tetrahydro-s-indacen-1-yl)(tertbutylamido)$MX_n$, where M is selected from Ti, Zr, and Hf; where X is selected from the group consisting of halogens, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, substituted derivatives thereof, and combinations thereof, and where n is zero or an integer from 1 to 4, such as where X is selected from halogens (such as bromide, fluoride, chloride), or $C_1$ to $C_{20}$ alkyls (such as methyl, ethyl, propyl, butyl, and pentyl) and n is 1 or 2.

In other embodiments, the catalyst is one or more of:

bis(1-methyl, 3-n-butyl cyclopentadienyl) $M(R)_2$;

dimethylsilyl bis(indenyl)$M(R)_2$;

bis(indenyl)$M(R)_2$;

dimethylsilyl bis(tetrahydroindenyl)$M(R)_2$;

bis(n-propylcyclopentadienyl)$M(R)_2$;

dimethylsilyl (tetramethylcyclopentadienyl)(cyclododecylamido)$M(R)_2$;

dimethylsilyl (tetramethylcyclopentadienyl)(t-butylamido) $M(R)_2$; dimethylsilyl (tetramethylcyclopentadienyl)(t-butylamido)$M(R)_2$;

μ-$(CH_3)_2$Si(cyclopentadienyl)(1-adamantylamido)$M(R)_2$;

μ-$(CH_3)_2$Si(3-tertbutylcyclopentadienyl)(1-adamantylamido)$M(R)_2$;

μ-$(CH_3)_2$(tetramethylcyclopentadienyl)(1-adamantylamido) $M(R)_2$;

μ-$(CH_3)_2$Si(tetramethylcyclopentadienyl)(1-adamantylamido)$M(R)_2$;

μ-$(CH_3)_2$C(tetramethylcyclopentadienyl)(1-adamantylamido)$M(R)_2$;

μ-$(CH_3)_2$Si(tetramethylcyclopentadienyl)(1-tertbutylamido) $M(R)_2$;

μ-$(CH_3)_2$Si(fluorenyl)(1-tertbutylamido)$M(R)_2$;

μ-$(CH_3)_2$Si(tetramethylcyclopentadienyl)(1-cyclododecylamido)$M(R)_2$;

μ-$(C_6H_5)_2$C(tetramethylcyclopentadienyl)(1-cyclododecylamido)$M(R)_2$;

μ-$(CH_3)_2$Si($\eta^5$-2,6,6-trimethyl-1,5,6,7-tetrahydro-s-indacen-1-yl)(tertbutylamido)$M(R)_2$;

where M is selected from Ti, Zr, and Hf; and R is selected from halogen or $C_1$ to $C_5$ alkyl.

In at least one embodiment, the catalyst compound is one or more of:

dimethylsilyl (tetramethylcyclopentadienyl)(cyclododecylamido)titanium dimethyl;

dimethylsilyl (tetramethylcyclopentadienyl)(t-butylamido) titanium dimethyl;

μ-$(CH_3)_2$Si(cyclopentadienyl)(1-adamantylamido)titanium dimethyl;

μ-$(CH_3)_2$Si(3-tertbutylcyclopentadienyl)(1-adamantylamido)titanium dimethyl;

μ-$(CH_3)_2$(tetramethylcyclopentadienyl)(1-adamantylamido) titanium dimethyl;

μ-$(CH_3)_2$Si(tetramethylcyclopentadienyl)(1-adamantylamido)titanium dimethyl;

μ-$(CH_3)_2$C(tetramethylcyclopentadienyl)(1-adamantylamido)titanium dimethyl;

μ-$(CH_3)_2$Si(tetramethylcyclopentadienyl)(1-tertbutylamido) titanium $dimethyl_2$;

μ-$(CH_3)_2$Si(fluorenyl)(1-tertbutylamido)titanium dimethyl;

μ-$(CH_3)_2$Si(tetramethylcyclopentadienyl)(1-cyclododecylamido)titanium dimethyl;

μ-$(C_6H_5)_2$C(tetramethylcyclopentadienyl)(1-cyclododecylamido)titanium dimethyl; and/or μ-$(CH_3)_2$Si($\eta^5$-2,6,6-trimethyl-1,5,6,7-tetrahydro-s-indacen-1-yl)(tertbutylamido)titanium dimethyl.

In at least one embodiment, the catalyst is rac-dimethylsilyl-bis(indenyl)hafnium dimethyl and or 1,1'-bis(4-triethylsilylphenyl)methylene-(cyclopentadienyl)(3,8-di-tertiary-butyl-1-fluorenyl)hafnium dimethyl.

In at least one embodiment, the catalyst compound is one or more of:

bis(1-methyl, 3-n-butyl cyclopentadienyl)hafnium dimethyl, bis(1-methyl, 3-n-butyl cyclopentadienyl)zirconium dimethyl, dimethylsilyl bis(indenyl)zirconium dimethyl, dimethylsilyl bis(indenyl)hafnium dimethyl, bis(indenyl)zirconium dimethyl, bis(indenyl)hafnium dimethyl, dimethylsilyl bis(tetrahydroindenyl)zirconium dimethyl, bis(n-propylcyclopentadienyl)zirconium dimethyl, dimethylsilylbis(tetrahydroindenyl)hafnium dimethyl, dimethylsilyl bis(2-methylindenyl)zirconium dimethyl, dimethylsilyl bis(2-methylfluorenyl)zirconium dimethyl, dimethylsilyl bis(2-methylindenyl)hafnium dimethyl, dimethylsilyl bis(2-methylfluorenyl)hafnium dimethyl, dimethylsilyl bis(2-methyl-5,7-propylindenyl) zirconium dimethyl, dimethylsilyl bis(2-methyl-4-phenylindenyl) zirconium dimethyl, dimethylsilyl bis(2-ethyl-5-phenylindenyl) zirconium dimethyl, dimethylsilyl bis(2-methyl-4-biphenylindenyl) zirconium dimethyl, dimethylsilylenebis(2-methyl-4-carbazolylindenyl) zirconium dimethyl, rac-dimethylsilyl-bis-(5,6,7,8-tetrahydro-5,5,8,8-tetramethyl-2-methyl-1H-benz(f)indene)hafnium dimethyl, diphenylmethylene (cyclopentadienyl)(fluorenyl)hafnium dimethyl, bis(methylcyclopentadienyl)zirconium dimethyl, rac-dimethylsilylbis(2-methyl, 3-propyl indenyl)hafnium dimethyl, dimethylsilylbis(indenyl)hafnium dimethyl, dimethylsilylbis(indenyl)zirconium dimethyl, dimethyl rac-dimethylsilyl-bis-(5,6,7,8-tetrahydro-5,5,8,8-tetramethyl-2-methyl-1H-benz(f)indene)hafnium dimethyl, Rac-meso-diphenylsilyl-bis(n-propylcyclopentadienyl)hafnium dimethyl, 1,1'-bis(4-triethylsilylphenyl)methylene-(cyclopentadienyl) (3,8-di-tertiary-butyl-1-fluorenyl)hafnium $X_n$ (bridge is considered the 1 position), bis-trimethylsilylphenyl-methylene(cyclopentadienyl)(di-t-butylfluorenyl)hafnium dimethyl, bis-trimethylsilylphenyl-methylene(cyclopentadienyl)(fluorenyl)hafnium dimethyl, bisphenylmethylene(cyclopentadienyl)(dimethylfluorenyl) hafnium dimethyl, bis(n-propylcyclopentadienyl)hafnium dimethyl, bis(n-butylcyclopentadienyl)hafnium dimethyl, bis(n-pentylcyclopentadienyl)hafnium dimethyl, (n-propyl cyclopentadienyl)(n-butylcyclopentadienyl)hafnium dimethyl, bis[(2-trimethylsilylethyl)cyclopentadienyl]hafnium dimethyl, bis(trimethylsilyl cyclopentadienyl)hafnium dimethyl, dimethylsilylbis(n-propylcyclopentadienyl)hafnium dimethyl, dimethylsilylbis(n-butylcyclopentadienyl)hafnium dimethyl, bis(1-n-propyl-2-methylcyclopentadienyl)hafnium dimethyl, and (n-propylcyclopentadienyl)(1-n-propyl-3-n-butylcyclopentadienyl)hafnium dimethyl, bis(n-propylcyclopentadienyl)hafnium dimethyl, bis(n-butylcyclopentadienyl)hafnium dimethyl, bis(n-pentylcyclopentadienyl)hafnium dimethyl,
(n-propyl cyclopentadienyl)(n-butylcyclopentadienyl)hafnium dimethyl,
bis[(2-trimethylsilylethyl)cyclopentadienyl]hafnium dimethyl,
bis(trimethylsilyl cyclopentadienyl)hafnium dimethyl,
dimethylsilylbis(n-propylcyclopentadienyl)hafnium dimethyl,
dimethylsilylbis(n-butylcyclopentadienyl)hafnium dimethyl,
bis(1-n-propyl-2-methylcyclopentadienyl)hafnium dimethyl,
(n-propylcyclopentadienyl)(1-n-propyl-3-n-butylcyclopentadienyl)hafnium dimethyl, and
dimethylsilyl(3-n-propylcyclopentadienyl)(tetramethylcyclopentadienyl)zirconium dimethyl.

Non-Metallocene Catalyst Compounds

Transition metal complexes for polymerization processes can include an olefin polymerization catalyst. Suitable catalyst components may include "non-metallocene complexes" that are defined to be transition metal complexes that do not feature a cyclopentadienyl anion or substituted cyclopentadienyl anion donors (e.g., cyclopentadienyl, fluorenyl, indenyl, methylcyclopentadienyl). Examples of families of non-metallocene complexes that may be suitable can include late transition metal pyridylbisimines (e.g., U.S. Pat. No. 7,087,686), group 4 pyridyldiamidos (e.g., U.S. Pat. No. 7,973,116), quinolinyldiamidos (e.g., U.S. Pub. No. 2018/0002352 A1), pyridylamidos (e.g., U.S. Pat. No. 7,087,690), phenoxyimines (e.g., Accounts of Chemical Research 2009, 42, 1532-1544), and bridged bi-aromatic complexes (e.g., U.S. Pat. No. 7,091,292), the disclosures of which are incorporated by reference.

Catalyst complexes that are suitable for use in combination with the activators include: pyridyldiamido complexes; quinolinyldiamido complexes; phenoxyimine complexes; bisphenolate complexes; cyclopentadienyl-amidinate complexes; and iron pyridyl bis(imine) complexes or combinations thereof, including any suitable combination with metallocene complexes.

The term "pyridyldiamido complex" or "pyridyldiamide complex" or "pyridyldiamido catalyst" or "pyridyldiamide catalyst" refers to a class of coordination complexes described in U.S. Pat. No. 7,973,116B2, US 2012/0071616A1, US 2011/0224391A1, US 2011/0301310A1, US 2015/0141601A1, U.S. Pat. Nos. 6,900,321 and 8,592,615 that feature a dianionic tridentate ligand that is coordinated to a metal center through one neutral Lewis basic donor atom (e.g., a pyridine group) and a pair of anionic amido or phosphido (i.e., deprotonated amine or phosphine) donors. In these complexes the pyridyldiamido ligand is coordinated to the metal with the formation of one five membered chelate ring and one seven membered chelate ring. It is possible for additional atoms of the pyridyldiamido ligand to be coordinated to the metal without affecting the catalyst function upon activation; an example of such coordination could be a cyclometalated substituted aryl group that forms an additional bond to the metal center.

The term "quinolinyldiamido complex" or "quinolinyldiamido catalyst" or "quinolinyldiamide complex" or "quinolinyldiamide catalyst" refers to a related class of pyridyldiamido complex/catalyst described in US 2018/0002352 where a quinolinyl moiety is present instead of a pyridyl moiety.

The term "phenoxyimine complex" or "phenoxyimine catalyst" refers to a class of coordination complexes described in EP 0 874 005 that feature a monoanionic bidentate ligand that is coordinated to a metal center through one neutral Lewis basic donor atom (e.g., an imine moiety) and an anionic aryloxy (i.e., deprotonated phenoxy) donor. Typically two of these bidentate phenoxyimine ligands are coordinated to a group 4 metal to form a complex that is useful as a catalyst component.

The term "bisphenolate complex" or "bisphenolate catalyst" refers to a class of coordination complexes described in U.S. Pat. No. 6,841,502, WO 2017/004462, and WO 2006/020624 that feature a dianionic tetradentate ligand that is coordinated to a metal center through two neutral Lewis basic donor atoms (e.g., oxygen bridge moieties) and two anionic aryloxy (i.e., deprotonated phenoxy) donors.

The term "cyclopentadienyl-amidinate complex" or "cyclopentadienyl-amidinate catalyst" refers to a class of coordination complexes described in U.S. Pat. No. 8,188,200 that typically feature a group 4 metal bound to a cyclopentadienyl anion, a bidentate amidinate anion, and a couple of other anionic groups.

The term "iron pyridyl bis(imine) complex" refers to a class of iron coordination complexes described in U.S. Pat. No. 7,087,686 that typically feature an iron metal center coordinated to a neutral, tridentate pyridyl bis(imine) ligand and two other anionic ligands.

Non-metallocene complexes can include iron complexes of tridentate pyridylbisimine ligands, zirconium and hafnium complexes of pyridylamido ligands, zirconium and hafnium complexes of tridentate pyridyldiamido ligands, zirconium and hafnium complexes of tridentate quinolinyldiamido ligands, zirconium and hafnium complexes of bidentate phenoxyimine ligands, and zirconium and hafnium complexes of bridged bi-aromatic ligands.

Suitable non-metallocene complexes can include zirconium and hafnium non-metallocene complexes. In at least one embodiment, non-metallocene complexes for the present disclosure include group 4 non-metallocene complexes including two anionic donor atoms and one or two neutral donor atoms. Suitable non-metallocene complexes for the present disclosure include group 4 non-metallocene complexes including an anionic amido donor. Suitable non-metallocene complexes for the present disclosure include group 4 non-metallocene complexes including an anionic aryloxide donor atom. Suitable non-metallocene complexes for the present disclosure include group 4 non-metallocene complexes including two anionic aryloxide donor atoms and two additional neutral donor atoms.

A catalyst compounds can be a quinolinyldiamido (QDA) transition metal complex represented by Formula (BI), such as by Formula (BII), such as by Formula (BIII):

(BI)

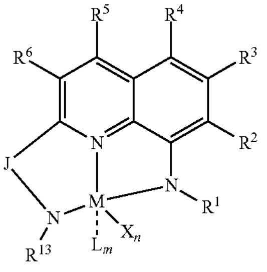

-continued (BII)

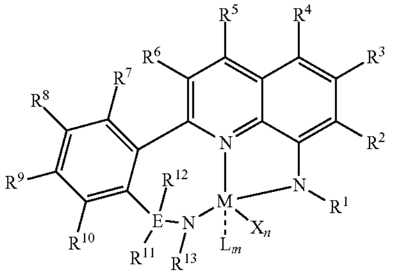

(BIII)

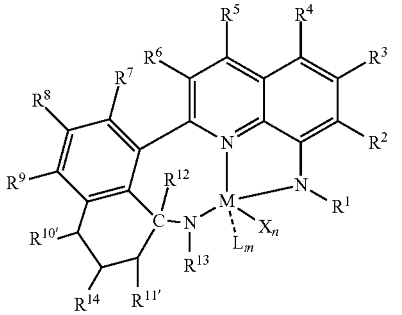

where:

M is a group 3, 4, 5, 6, 7, 8, 9, 10, 11, or 12 metal, such as a group 4 metal;

J is group including a three-atom-length bridge between the quinoline and the amido nitrogen, such as a group containing up to 50 non-hydrogen atoms;

E is carbon, silicon, or germanium;

X is an anionic leaving group, (such as a hydrocarbyl group or a halogen);

L is a neutral Lewis base;

$R^1$ and $R^{13}$ are independently selected from the group including of hydrocarbyls, substituted hydrocarbyls, and silyl groups;

$R^2$, $R^3$, $R^4$, $R^5$, $R^6$, $R^7$, $R^8$, $R^9$, $R^{10}$, $R^{10'}$, $R^{11}$, $R^{11'}$, $R^{12}$, and $R^{14}$ are independently hydrogen, hydrocarbyl, alkoxy, silyl, amino, aryloxy, substituted hydrocarbyl, halogen, or phosphino;

n is 1 or 2;

m is 0, 1, or 2, where n+m is not greater than 4; and two R groups (e.g., $R^1$ & $R^2$, $R^2$ & $R^3$, $R^{10}$ and $R^{11}$, etc.) may be joined to form a substituted hydrocarbyl, unsubstituted hydrocarbyl, substituted heterocyclic, or unsubstituted heterocyclic, saturated or unsaturated ring, where the ring has 5, 6, 7, or 8 ring atoms and where substitutions on the ring can join to form additional rings;

two X groups may be joined together to form a dianionic group;

two L groups may be joined together to form a bidentate Lewis base; and an X group may be joined to an L group to form a monoanionic bidentate group.

In at least one embodiment, M is a group 4 metal, such as zirconium or hafnium, such as M is hafnium.

Representative non-metallocene transition metal compounds usable for forming poly(alpha-olefin)s of the present disclosure also include tetrabenzyl zirconium, tetra bis(trimethylsilylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris(trimethylsilylmethyl) tantalum dichloride.

In at least one embodiment, J is an aromatic substituted or unsubstituted hydrocarbyl having from 3 to 30 non-hydrogen atoms, such as J is represented by the formula:

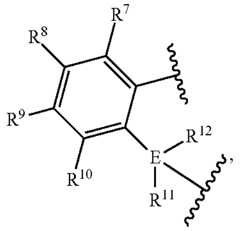

such as J is

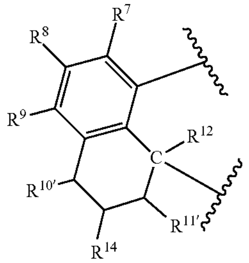

where $R^7$, $R^8$, $R^9$, $R^{10}$, $R^{10'}$, $R^{11}$, $R^{11'}$, $R^{12}$, $R^{14}$ and E are as defined above, and two R groups (e.g., $R^7$ & $R^8$, $R^8$ & $R^9$, $R^9$ & $R^{10}$, $R^{10}$ & $R^{11}$, etc.) may be joined to form a substituted or unsubstituted hydrocarbyl or heterocyclic ring, where the ring has 5, 6, 7, or 8 ring atoms (such as 5 or 6 atoms), and said ring may be saturated or unsaturated (such as partially unsaturated or aromatic), such as J is an arylalkyl (such as arylmethyl, etc.) or dihydro-1H-indenyl, or tetrahydronaphthalenyl group.

In at least one embodiment, J is selected from the following structures:

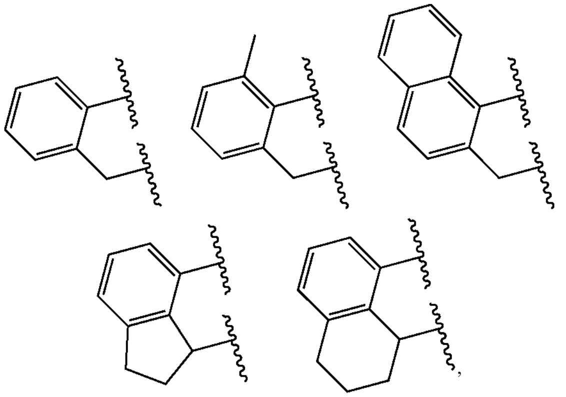

where  indicates connection to the complex.

In at least one embodiment, E is carbon.

X may be an alkyl (such as alkyl groups having 1 to 10 carbons, such as methyl, ethyl, propyl, butyl, pentyl, hexyl, heptyl, octyl, nonyl, decyl, and isomers thereof), aryl, hydride, alkylsilane, fluoride, chloride, bromide, iodide, triflate, carboxylate, amido (such as $NMe_2$), or alkylsulfonate.

In at least one embodiment, L is an ether, amine or thioether.

In at least one embodiment, $R^7$ and $R^8$ are joined to form a six-membered aromatic ring with the joined $R^7/R^8$ group being —CH═CHCH═CH—.

$R^{10}$ and $R^{11}$ may be joined to form a five-membered ring with the joined $R^{10}R^{11}$ group being $—CH_2CH_2—$.

In at least one embodiment, $R^{10}$ and $R^{11}$ are joined to form a six-membered ring with the joined $R^{10}R^{11}$ group being $—CH_2CH_2CH_2—$.

$R^1$ and $R^{13}$ may be independently selected from phenyl groups that are variously substituted with zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment, the QDA transition metal complex represented by the Formula (II) above where:

M is a group 4 metal (such hafnium);

E is selected from carbon, silicon, or germanium (such as carbon);

X is an alkyl, aryl, hydride, alkylsilane, fluoride, chloride, bromide, iodide, triflate, carboxylate, amido, alkoxo, or alkylsulfonate;

L is an ether, amine, or thioether;

$R^1$ and $R^{13}$ are independently selected from the group consisting of hydrocarbyls, substituted hydrocarbyls, and silyl groups (such as aryl);

$R^2$, $R^3$, $R^4$, $R^6$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyls, halogen, and phosphino;

n is 1 or 2;

m is 0, 1, or 2;

n+m is from 1 to 4;

two X groups may be joined together to form a dianionic group;

two L groups may be joined together to form a bidentate Lewis base;

an X group may be joined to an L group to form a monoanionic bidentate group;

$R^7$ and $R^8$ may be joined to form a ring (such as an aromatic ring, a six-membered aromatic ring with the joined $R^7R^8$ group being —CH═CHCH═CH—); and $R^{10}$ and $R^{11}$ may be joined to form a ring (such as a five-membered ring with the joined $R^{10}R^{11}$ group being $—CH_2CH_2—$, a six-membered ring with the joined $R^{10}R^{11}$ group being $—CH_2CH_2CH_2—$).

In at least one embodiment of Formula (BI), (BII), and (BIII), $R^4$, $R^5$, and $R^6$ are independently selected from the group including hydrogen, hydrocarbyls, substituted hydrocarbyls, alkoxy, aryloxy, halogen, amino, and silyl, and where adjacent R groups ($R^4$ and $R^5$ and/or $R^5$ and $R^6$) are joined to form a substituted hydrocarbyl, unsubstituted hydrocarbyl, unsubstituted heterocyclic ring or substituted heterocyclic ring, where the ring has 5, 6, 7, or 8 ring atoms and where substitutions on the ring can join to form additional rings.

In at least one embodiment of Formula (BI), (BII), and (BII), $R^7$, $R^8$, $R^9$, and $R^{10}$ are independently selected from the group including hydrogen, hydrocarbyls, substituted hydrocarbyls, alkoxy, halogen, amino, and silyl, and where adjacent R groups ($R^7$ and $R^8$ and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In at least one embodiment of Formula (BI), (BII), and (BIII), $R^2$ and $R^3$ are each, independently, selected from the group including hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In at least one embodiment of Formula (BI), (BII), and (BIII), $R^{11}$ and $R^{12}$ are each, independently, selected from the group including hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings, or $R^{11}$ and $R^{10}$ may be joined to form a saturated heterocyclic ring, or a saturated substituted heterocyclic ring where substitutions on the ring can join to form additional rings.

In at least one embodiment of Formula (BI), (BII), and (BIII), $R^1$ and $R^{13}$ are independently selected from phenyl groups that are variously substituted with zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In at least one embodiment of Formula (BII), suitable $R^{12}$-E-$R^{11}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl), where alkyl is a $C_1$ to $C_{40}$ alkyl group (such as $C_1$ to $C_{20}$ alkyl, such as one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (such as a $C_6$ to $C_{20}$ aryl group, such as phenyl or substituted phenyl, such as phenyl, 2-isopropylphenyl, or 2-tertbutylphenyl).

In at least one embodiment of Formula (BIII), $R^{11}$, $R^{12}$, $R^9$, $R^{14}$, and $R^{10}$ are independently selected from the group consisting of hydrogen, hydrocarbyls, substituted hydrocarbyls, alkoxy, halogen, amino, and silyl, and where adjacent R groups ($R^{10}$ and $R^{14}$, and/or $R^{11}$ and $R^{14}$, and/or $R^9$ and $R^{10}$) may be joined to forma saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

The R groups above (such as, individually $R^2$ to $R^{14}$) and other R groups mentioned hereafter may contain from 1 to 30, such as 2 to 20 carbon atoms, such as from 6 to 20 carbon atoms. The R groups above (such as, individually $R^2$ to $R^{14}$) and other R groups mentioned hereafter, may be independently selected from the group including hydrogen, methyl, ethyl, phenyl, isopropyl, isobutyl, trimethylsilyl, and $—CH_2—Si(Me)_3$.

In at least one embodiment, the quinolinyldiamide complex is linked to one or more additional transition metal complex, such as a quinolinyldiamide complex or another suitable non-metallocene, through an R group in such a fashion as to make a bimetallic, trimetallic, or multimetallic complex that may be used as a catalyst component for olefin polymerization. The linker R-group in such a complex may contain 1 to 30 carbon atoms.

In at least one embodiment, E is carbon and R and $R^{12}$ are independently selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyl groups with from one to ten carbons.

In at least one embodiment of Formula (BI) or (BIII), $R^{11}$ and $R^{12}$ are independently selected from hydrogen, methyl, ethyl, phenyl, isopropyl, isobutyl, $—CH_2—Si(Me)_3$, and trimethylsilyl.

In at least one embodiment of Formula (BIT), and (BIII), $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, $—CH_2—Si(Me)_3$, and trimethylsilyl.

In at least one embodiment of Formula (BI), (BII), and (BIII), $R^2$, $R^3$, $R^4$, $R^5$, and $R^6$ are independently selected from the group consisting of hydrogen, hydrocarbyls, alkoxy, silyl, amino, substituted hydrocarbyls, and halogen.

In at least one embodiment of Formula (BIII), $R^{10}$, $R^{11}$ and $R^{14}$ are independently selected from hydrogen, methyl, ethyl, phenyl, isopropyl, isobutyl, $—CH_2—Si(Me)_3$, and trimethylsilyl.

In at least one embodiment of Formula (BI), (BII), and (BIII), each L is independently selected from $Et_2O$, MeOtBu, $Et_3N$, $PhNMe_2$, $MePh_2N$, tetrahydrofuran, and dimethylsulfide.

In at least one embodiment of Formula (BI), (BII), and (BIII), each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In at least one embodiment of Formula (BI), (BIT), and (BITT), $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl.

In at least one embodiment of Formula (BI), (BII), and (BIT), $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In at least one embodiment of Formula (BII), J is dihydro-1H-indenyl and $R^1$ is 2,6-dialkylphenyl or 2,4,6-trialkylphenyl.

In at least one embodiment of Formula (BI), (BII), and (BIII), $R^1$ is 2,6-diisopropylphenyl and $R^{13}$ is a hydrocarbyl group containing 1, 2, 3, 4, 5, 6, or 7 carbon atoms.

An exemplary catalyst used for polymerizations of the present disclosure is (QDA-1)$HfMe_2$, as described in U.S. Pub. No. 2018/0002352 A1.

(QDA-1)HfMe2

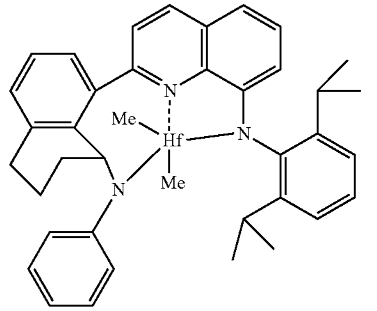

In at least one embodiment, the catalyst compound is a bis(phenolate) catalyst compound represented by Formula (CI):

(CI)

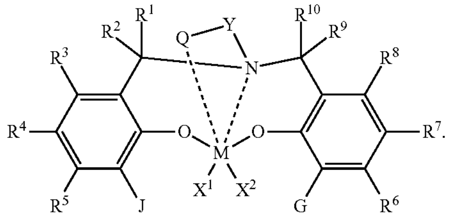

M is a Group 4 metal, such as Hf or Zr. X and X2 are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure. $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_4$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is heterocycle, a substituted or unsubstituted $C_7$-$C_{60}$ fused polycyclic group, where at least one ring is aromatic and where at least one ring, which may or may not be aromatic, has at least five ring atoms' G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; Y is divalent $C_1$-$C_{20}$ hydrocarbyl or divalent $C_1$-$C_{20}$ substituted hydrocarbyl or (-Q-Y—) together form a heterocycle; and heterocycle may be aromatic and/or may have multiple fused rings.

In at least one embodiment, the catalyst compound represented by Formula (CI) is represented by Formula (CII) or Formula (CIII):

(CII)

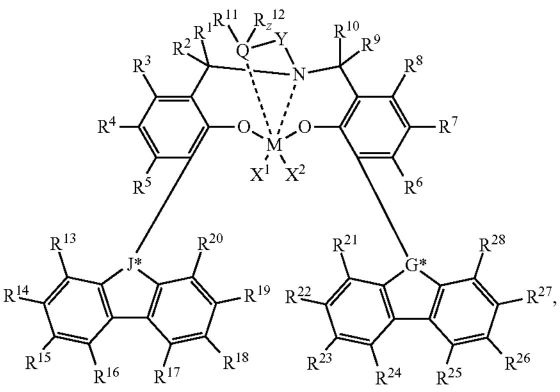

or (CIII)

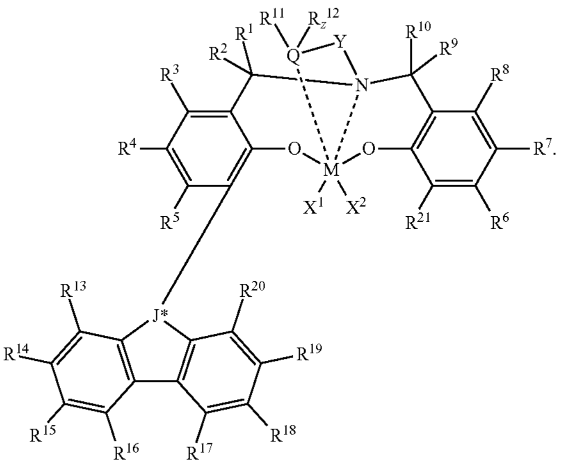

M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (CI). $R^{11}$, $R^{12}$, $R^{13}$, $R^{14}$, $R^{15}$, $R^{16}$, $R^{17}$, $R^1$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, $C_1$-$C_{40}$ substituted hydrocarbyl, a functional group including elements from Groups 13 to 17, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; R and $R^{12}$ may join together to form a five- to eight-membered heterocycle; Q* is a group 15 or 16 atom; z is 0 or 1; J* is CR" or N, and G* is CR" or N, where R" is $C_1$-$C_{20}$ hydrocarbyl or carbonyl-containing $C_1$-$C_2$ hydrocarbyl; and z=0 if Q* is a group 16 atom, and z=1 if Q* is a group 15 atom.

In at least one embodiment the catalyst is an iron complex represented by formula (IV):

(IV)

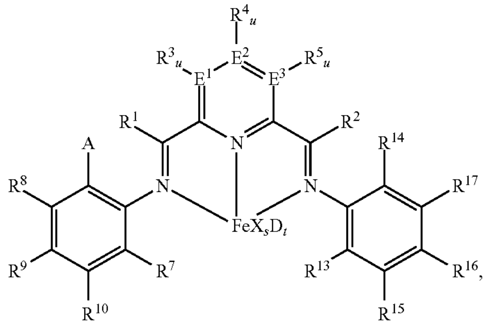

where:

A is chlorine, bromine, iodine, $-CF_3$ or $-OR^{11}$;

each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl including at least one atom selected from the group consisting of N, P, O and S;

where each of R and $R^2$ is optionally substituted by halogen, $-NR^{11}_2$, $-OR^{11}$ or $-SiR^{12}_3$; where $R^1$ optionally bonds with $R^3$, and $R^2$ optionally bonds with $R^5$, in each case to independently form a five-, six- or seven-membered ring;

$R^7$ is a $C_1$-$C_{20}$ alkyl;

each of $R^3$, $R^4$, $R^5$, $R^8$, $R^9$, $R^{10}$, $R^{15}$, $R^{16}$, and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, $-NR^{11}_2$, $-OR^{11}$, halogen, $-SiR^{12}_3$ or five-, six- or seven-membered heterocyclyl including at least one atom selected from the group consisting of N, P, O, and S; where $R^3$, $R^4$, $R^5$, $R^7$, $R^8$, $R^9$, $R^{10}$, $R^{15}$, $R^{16}$, and $R^{17}$ are optionally substituted by halogen, $-NR^{11}_2$, $-OR^{11}$ or $-SiR^{12}_3$;

where $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^{17}$ optionally bonds with $R^{16}$, and $R^{16}$ optionally bonds with $R^{15}$, in each case to independently form a five-, six- or seven-membered carbocyclic or heterocyclic ring, the heterocyclic ring including at least one atom from the group consisting of N, P, O and S;

$R^{13}$ is $C_1$-$C_{20}$-alkyl bonded with the aryl ring via a primary or secondary carbon atom;

$R^{14}$ is chlorine, bromine, iodine, $-CF_3$ or $-OR^{11}$, or $C_1$-$C_{20}$-alkyl bonded with the aryl ring; each $R^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or $-SiR^{12}_3$, where $R^{11}$ is optionally substituted by halogen, or two $R^{11}$ radicals optionally bond to form a five- or six-membered ring;

each $R^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring;

each of $E^1$, $E^2$, and $E^3$ is independently carbon, nitrogen or phosphorus;

each u is independently 0 if $E^1$, $E^2$, and $E^3$ is nitrogen or phosphorus and is 1 if $E^1$, $E^2$, and $E^3$ is carbon;

each X is independently fluorine, chlorine, bromine, iodine, hydrogen, $C_1$-$C_{20}$-alkyl, $C_2$-$C_{10}$-alkenyl, $C_6$-$C_2$-aryl, arylalkyl where alkyl has from 1 to 10 carbon atoms and aryl has from 6 to 20 carbon atoms, —$NR^{18}_2$, —$OR^{18}$, —$SR^{18}$, —$SO_3R^{18}$, —$OC(O)R^{18}$, —CN, —SCN, β-diketonate, —CO, —$BF_4$—, —$PF_6$— or bulky non-coordinating anions, and the radicals X can be bonded with one another;

each $R^8$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or —$SiR^{19}_3$, where $R^{18}$ can be substituted by halogen or nitrogen- or oxygen-containing groups and two $R^{18}$ radicals optionally bond to form a five- or six-membered ring;

each $R^{19}$ is independently hydrogen, $C_1$-$C_2$-alkyl, $C_2$-$C_{20}$-alkenyl, $C_6$-$C_2$-aryl or arylalkyl where alkyl has from 1 to 10 carbon atoms and aryl has from 6 to 20 carbon atoms, where $R^{19}$ can be substituted by halogen or nitrogen- or oxygen-containing groups or two $R^{19}$ radicals optionally bond to form a five- or six-membered ring;

s is 1, 2, or 3;

D is a neutral donor; and t is 0 to 2.

In another embodiment, the catalyst is a phenoxyimine compound represented by the formula (VII):

(VII)

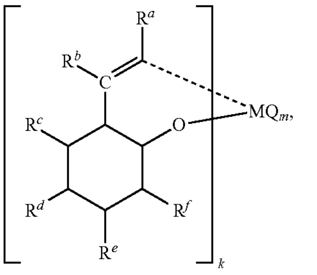

where M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^c$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

In another embodiment, the catalyst is a bis(imino)pyridyl of the formula (VIII):

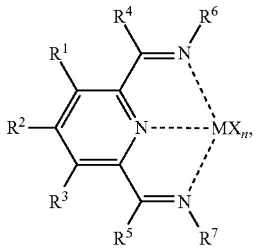

where:

M is Co or Fe; each X is an anion; n is 1, 2 or 3, so that the total number of negative charges on said anion or anions is equal to the oxidation state of a Fe or Co atom present in (VIII);

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ is formula IX:

(IX)

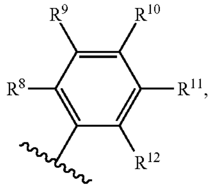

and $R^7$ is formula X:

(X)

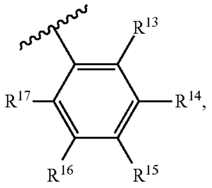

$R^8$ and $R^{13}$ are each independently hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that two of $R^8$, $R^9$, $R^{10}$, $R^{11}$, $R^{12}$, $R^{13}$, $R^{14}$, $R^{15}$, $R^{16}$ and $R^{17}$ that are adjacent to one another, together may form a ring.

In at least one embodiment, the catalyst compound is represented by the formula (XI):

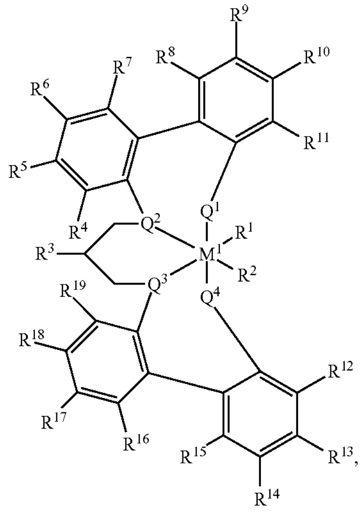

(XI)

$M^1$ is selected from the group consisting of titanium, zirconium, hafnium, vanadium, niobium, tantalum, chromium, molybdenum and tungsten. In at least one embodiment, $M^1$ is zirconium.

Each of $Q^1$, $Q^2$, $Q^3$, and $Q^4$ is independently oxygen or sulfur. In at least one embodiment, at least one of $Q^1$, $Q^2$, $Q^3$, and $Q^4$ is oxygen, alternately all of $Q^1$, $Q^2$, $Q^3$, and $Q^4$ are oxygen.

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_4$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. In at least one embodiment, $R^1$ and $R^2$ are chlorine.

Alternatively, $R^1$ and $R^2$ may also be joined together to form an alkanediyl group or a conjugated $C_4$-$C_{40}$ diene ligand which is coordinated to M. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a π-complex with $M^1$.

Exemplary groups suitable for $R^1$ and or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis (trimethylsilyl)-1,3-butadiene, and 1,4-dinaphthyl-1,3-butadiene. R and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_4$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. In at least one embodiment, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. In at least one embodiment, $R^6$ and $R^{17}$ are $C_{1-40}$ alkyl, such as $C_1$-$C_{10}$ alkyl.

In at least one embodiment, each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. In at least one embodiment, each of $R^6$ and $R^1$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

$R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

In at least one embodiment, $R^3$ is a hydrocarbyl including a vinyl moiety. The terms "vinyl" and "vinyl moiety" are used interchangeably and include a terminal alkene, e.g., represented by the structure

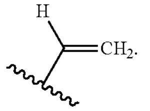

Hydrocarbyl of $R^3$ may be further substituted (such as $C_1$-$C_{10}$ alkyl, $C_1$-$C_{10}$ alkoxy, $C_6$-$C_2$ aryl, $C_6$-$C_{10}$ aryloxy, $C_2$-$C_{10}$ alkenyl, $C_2$-$C_4$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). In at least one embodiment, $R^3$ is $C_1$-$C_{40}$ unsaturated alkyl that is vinyl or substituted $C_1$-$C_{40}$ unsaturated alkyl that is vinyl. $R^3$ can be represented by the structure —R'CH═CH$_2$ where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

In at least one embodiment, the catalyst is a Group 15-containing metal compound represented by Formulas (XII) or (XIII):

(XII)

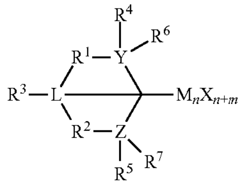

(XIII)

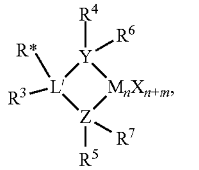

where M is a Group 3 to 12 transition metal or a Group 13 or 14 main group metal, a Group 4, 5, or 6 metal. In some embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term "n" is the oxidation state of M. In various embodiments, n is +3, +4, or +5. In some embodiments, n is +4. The term "m" represents the formal charge of the YZL or the YZL' ligand, and is 0, −1, −2 or −3 in various embodiments. In some embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In some embodiments, Y is nitrogen. Z is a Group 15 element, such as nitrogen or phosphorus. In some embodiments, Z is nitrogen. $R^1$ and $R^2$ are, independently, a $C_2$ to $C_{20}$ hydrocarbon group, a heteroatom containing group having up to twenty carbon atoms, silicon, germanium, tin, lead, or phosphorus. In some embodiments, $R^1$ and $R^2$ are a $C_2$ to $C_{20}$ alkyl, aryl or aralkyl group, such as a $C_2$ to $C_{20}$ linear, branched or cyclic alkyl group, or a $C_2$ to $C_{20}$ hydrocarbon group. $R^1$ and $R^2$ may also be interconnected to each other. $R^3$ may be absent or may be a hydrocarbon group, a hydrogen, a halogen, a heteroatom containing group. In some embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In some embodiments, $R^4$ and $R^5$ have 3 to 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In some embodiments, $R^6$ and $R^7$ are absent. R* may be absent, or may be a hydrogen, a Group 14 atom containing group, a halogen, or a heteroatom containing group.

The term "formal charge of the YZL or YZL' ligand," means the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by structure (XIV):

(XIV)

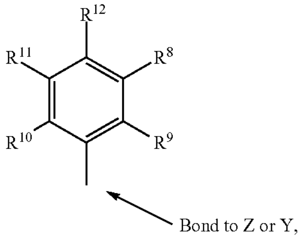

where $R^8$ to $R^{12}$ are each independently hydrogen, a $C_1$ to $C_{40}$ alkyl group, a halide, a heteroatom, a heteroatom containing group containing up to 40 carbon atoms. In some embodiments, R to $R^{12}$ are a $C_1$ to $C_{20}$ linear or branched alkyl group, such as a methyl, ethyl, propyl, or butyl group. Two of the R groups may form a cyclic group and/or a heterocyclic group. The cyclic groups may be aromatic. In at least one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by structure (XV):

(XV)

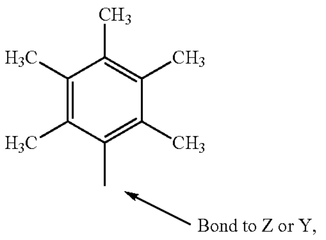

where M is a Group 4 metal, such as zirconium, titanium, or hafnium. In at least one embodiment, M is zirconium. Each of L, Y, and Z may be a nitrogen. Each of $R^1$ and $R^2$ may be $—CH_2—CH_2—$. $R^3$ may be hydrogen, and $R^6$ and $R^7$ may be absent.

In one or more embodiments, the catalyst compounds described in PCT/US2018/051345, filed Sep. 17, 2018 may be used with the activators, including the catalyst compounds described at Page 16 to Page 32 of the application as filed.

In some embodiments, a co-activator is combined with the catalyst compound (such as halogenated catalyst compounds described above) to form an alkylated catalyst compound. Organoaluminum compounds which may be utilized as co-activators include, for example, trialkyl aluminum compounds, such as trimethylaluminum, triethylaluminum, triisobutylaluminum, tri-n-hexylaluminum, tri-n-octylaluminum, and the like, or alumoxanes.

In some embodiments, two or more different catalyst compounds are present in the catalyst system. In some embodiments, two or more different catalyst compounds are present in the reaction zone where the polymerization process(es) occur. When two transition metal compound based catalysts are used in one reactor as a mixed catalyst system, the two transition metal compounds may be chosen such that the two are compatible. A simple screening method such as by $^1H$ or $^{13}C$ NMR, can be used to determine which transition metal compounds are compatible. It is preferable to use the same activator for the transition metal compounds, however, two different activators can be used in combination. If one or more transition metal compounds contain an anionic ligand as a leaving group which is not a hydride, hydrocarbyl, or substituted hydrocarbyl, then the alumoxane or other alkyl aluminum is typically contacted with the transition metal compounds prior to addition of the non-coordinating anion activator.

The two transition metal compounds (pre-catalysts) may be used in any suitable ratio. Molar ratios of (A) transition metal compound to (B) transition metal compound may (A:B) may be from 1:1000 to 1000:1, from 1:100 to 500:1, from 1:10 to 200:1, from 1:1 to 100:1, from 1:1 to 75:1, or from 5:1 to 50:1. The particular ratio chosen will depend on the exact pre-catalysts chosen, the method of activation, and the end product. In a particular embodiment, when using the two pre-catalysts, where both are activated with the same activator, useful mole percent, based upon the molecular weight of the pre-catalysts, are 10 to 99.9 mol % A to 0.1 to 90 mol % B, 25 to 99 mol % A to 0.5 to 50 mol % B, 50 to 99 mol % A to 1 to 25 mol % B, or 75 to 99 mol % A to 1 to 10 mol % B.

Support Materials

In some embodiments, the catalyst system may include a support material. In at least one embodiment, the support material is a porous support material, for example, talc, or inorganic oxides. Other support materials include zeolites, clays, organoclays, or any other suitable organic or inorganic support material and the like, or mixtures thereof.

In at least one embodiment, the support material is an inorganic oxide. Suitable inorganic oxide materials for use in catalyst systems include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be used, for example, functionalized polyolefins, such as polypropylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area of from 10 $m^2/g$ to 700 $m^2/g$, pore volume of from 0.1 cc/g to 4 cc/g and average particle size of from 5 μm to 500 μm. In at least one embodiment, the surface area of the support material is of from 50 $m^2/g$ to 500 $m^2/g$, pore volume of from 0.5 cc/g to 3.5 cc/g and average particle size of from 10 μm to 200 μm. In at least one embodiment, the surface area of the support material is from 100 $m^2/g$ to 400 $m^2/g$, pore volume from 0.8 cc/g to 3 cc/g and average particle size is from 5 μm to 100 μm. The average pore size of the support material useful in the present disclosure is from 10 Å to 1000 Å, such as 50 Å to 500 Å, such as 75 Å to 350 Å. In some embodiments, the support material is a high surface area, amorphous silica (surface area=300 $m^2/gm$; pore volume of 1.65 $cm^3/gm$). Exemplary silicas are marketed under the tradenames of DAVISON 952 or DAVISON 955 by the Davison Chemical Division of W.R. Grace and Company. In other embodiments DAVISON 948 is used.

The support material should be dry, that is, substantially free of absorbed water. Drying of the support material can be effected by heating or calcining at 100° C. to 1000° C., such as at least about 600° C. When the support material is silica, the silica is heated to at least 200° C., such as 200° C. to 850° C., such as at about 600° C.; and for a time of 1 minute to about 100 hours, from 12 hours to 72 hours, or from 24 hours to 60 hours. The calcined support material should have at least some reactive hydroxyl (OH) groups to produce supported catalyst systems of the present disclosure. The calcined support material is then contacted with at least one polymerization catalyst including at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator from 0.5 hours to 24 hours, from 2 hours to 16 hours, or from 4 hours to 8 hours. The solution of the catalyst compound is then contacted with the isolated support/activator. In some embodiments, the supported catalyst system is generated in situ. In at least one embodiment, the slurry of the support material is first contacted with the catalyst compound from 0.5 hours to 24 hours, from 2 hours to 16 hours, or from 4 hours to 8 hours. The slurry of the supported catalyst compound is then contacted with the activator solution.

The mixture of the catalyst, activator and support is heated to 0° C. to 70° C., such as to 23° C. to 60° C., such as at room temperature. Contact times are typically from 0.5 hours to 24 hours, from 2 hours to 16 hours, or from 4 hours to 8 hours.

Suitable non-polar solvents are materials in which all of the reactants, e.g., the activator, and the catalyst compound, are at least partially soluble and which are liquid at room temperature. Non-limiting examples of non-polar solvents are alkanes, such as isopentane, hexane, n-heptane, octane, nonane, and decane, cycloalkanes, such as cyclohexane, and aromatics, such as benzene, toluene, and ethylbenzene.

In at least one embodiment, the support material includes a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or combinations thereof.

The electron-withdrawing component used to treat the support material can be any suitable component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or combinations thereof. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can include, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Furthermore, the activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, $[H(OEt_2)_2]+$, or combinations thereof.

Further, combinations of one or more different electron-withdrawing anions, in varying proportions, can be used to tailor the specific acidity of the support material. Combinations of electron-withdrawing components can be contacted with the support material simultaneously or individually, and in any suitable order to provide a chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process including: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

The present disclosure relates to polymerization processes where monomer (e.g., ethylene; propylene), and optionally comonomer, are contacted with a catalyst system including an activator and at least one catalyst compound, as described above. The catalyst compound and activator may be combined in any suitable order. The catalyst compound and activator may be combined prior to contacting with the monomer. Alternatively the catalyst compound and activator may be introduced into the polymerization reactor separately, where they subsequently react to form the active catalyst.

Monomers may include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer including one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and or one or more functional groups. In another embodiment, the monomer includes propylene and an optional comonomer including one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbomene, ethylidenenorbornene, vinylnorbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbomene, norbomadiene, and their respective homologs and derivatives, such as norbomene, norbornadiene, and dicyclopentadiene.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. A bulk homogeneous process can be used. Alternately, no solvent or diluent is present or added in the reaction medium, (except for the small amounts used as the carrier for the catalyst system or other additives, or amounts found with the monomer; e.g., propane in propylene). In another embodiment, the process is a slurry process. The term “slurry polymerization process” means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization may include non-coordinating, inert liquids. Examples of diluents/solvents for polymerization may include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any suitable temperature and or pressure to obtain a desired polyolefin. Suitable temperatures and or pressures include a temperature of from about 0° C. to about 300° C., such as about 20° C. to about 200° C., such as about 35° C. to about 160° C., such as from about 80° C. to about 160° C., such as from about 90° C. to about 140° C. Polymerizations can be run at a pressure of from about 0.1 MPa to about 25 MPa, such as from about 0.45 MPa to about 6 MPa, or from about 0.5 MPa to about 4 MPa.

In a suitable polymerization, the run time of the reaction can be up to 300 minutes, such as from about 5 minutes to 250 minutes, such as from about 10 minutes to 120 minutes, such as from about 20 minutes to 90 minutes, such as from about 30 minutes to 60 minutes. In a continuous process the run time may be the average residence time of the reactor. In at least one embodiment, the run time of the reaction is from about 5 minutes to about 25 minutes.

In at least one embodiment, hydrogen is present in the polymerization reactor at a partial pressure of 0.001 psig to 50 psig (0.007 kPa to 345 kPa), such as from 0.01 psig to 25 psig (0.07 kPa to 172 kPa), such as from 0.1 psig to 10 psig (0.7 kPa to 70 kPa).

In at least one embodiment, little or no alumoxane is used in the process to produce the polymers. For example, alumoxane can be present at zero mol %, alternately the alumoxane can be present at a molar ratio of aluminum to transition metal less than 500:1, such as less than 300:1, such as less than 100:1, such as less than 1:1.

In at least one embodiment, the polymerization: 1) is conducted at temperatures of 0° C. to 300° C. (such as 25° C. to 250° C., such as 80° C. to 160° C., such as 100° C. to 140° C.); 2) is conducted at a pressure of atmospheric pressure to 10 MPa (such as 0.35 MPa to 10 MPa, such as from 0.45 MPa to 6 MPa, such as from 0.5 MPa to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents); 4) where the catalyst system used in the polymerization includes less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 7) optionally hydrogen is present in the polymerization reactor at a partial pressure of 0.001 psig to 50 psig (0.007 kPa to 345 kPa) (such as from 0.01 psig to 25 psig (0.07 kPa to 172 kPa), such as 0.1 psig to 10 psig (0.7 kPa to 70 kPa)). In at least one embodiment, the catalyst system used in the polymerization includes no more than one catalyst compound. A “reaction zone” also referred to as a “polymerization zone” is a vessel where polymerization takes place, for example a stirred-tank reactor or a loop reactor. When multiple reactors are used in a continuous polymerization process, each reactor is considered as a separate polymerization zone. For a multi-stage polymerization in a batch polymerization process, each polymerization stage is considered as a separate polymerization zone. In at least one embodiment, the polymerization occurs in one reaction zone. Room temperature is 23° C. unless otherwise noted.

In at least one embodiment, the present disclosure provides a process for the production of an ethylene based polymer including: polymerizing ethylene by contacting the ethylene with the catalyst system of the present disclosure described above in one or more continuous stirred tank reactors or loop reactors, in series or in parallel, at a reactor pressure of from 0.05 MPa to 1,500 MPa and a reactor temperature of from 30° C. to 230° C. to form an ethylene based polymer. In at least one embodiment, hydrogen is present in the polymerization reactor at a partial pressure of from about 5 psig to about 300 psig, such as from about 10 psig to about 250 psig, such as from about 30 psig to about 200 psig, such as from about 20 psig to about 150 psig, such as from about 50 psig to about 100 psig (e.g., 75 psig).

In another embodiment, the present disclosure provides a process for the production of propylene based polymer including: polymerizing propylene by contacting the propylene with the catalyst system of the present disclosure described above in one or more continuous stirred tank reactors or loop reactors, in series or in parallel, at a reactor pressure of from 0.5 MPa to 1,500 MPa and a reactor temperature of from 30° C. to 230° C. to form a propylene based polymer. In at least one embodiment, hydrogen is present in the polymerization reactor at a partial pressure from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig).

In another embodiment, the present disclosure provides a process for the production of an ethylene alpha-olefin copolymer including: polymerizing ethylene and at least one $C_3$-$C_{20}$ alpha-olefin (e.g., hexene) by contacting the ethylene and the at least one $C_3$-$C_{20}$ alpha-olefin (e.g., hexene) with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig).

In at least one embodiment, a process for the production of an ethylene alpha-olefin copolymer includes: polymerizing ethylene and at least one $C_3$-$C_{20}$ alpha-olefin by contacting the ethylene and the at least one $C_3$-$C_{20}$ alpha-olefin with catalyst system described above in at least one gas phase reactor at a reactor pressure of from 0.7 bar to 70 bar (e.g., 17 bar) and a reactor temperature of from 20° C. to 150° C., such as from 50° C. to 120° C., such as from 70° C. to 110° C. (e.g., 85° C.) to form an ethylene alpha-olefin copolymer.

In another embodiment, the present disclosure provides a process for the production of a propylene alpha-olefin copolymer including: polymerizing propylene and at least one ethylene and or at least one $C_4$-$C_{20}$ alpha-olefin by contacting the propylene and the at least one ethylene and or at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig).

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

Other additives may optionally be used in the polymerization, such as one or more scavengers, hydrogen, aluminum alkyls, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are not turbid as described in J. Vladimir Oliveira, C. Dariva and J. C. Pinto, Ind. Eng, Chem. Res. 29, 2000, 4627. Solution polymerization may involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes can operate at temperatures from about 0° C. to about 250° C., such as from about 50° C. to about 170° C., such as from about 80° C. to about 150° C., such as from about 100° C. to about 140° C., and or at pressures of about 0.1 MPa or more, such as 2 MPa or more. The upper pressure value is not critically constrained but can be about 200 MPa or less, such as 120 MPa or less, such as 30 MPa or less. Temperature control in the reactor can typically be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be adjusted for improved catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

A polymerization process can be a solution polymerization process that may be performed in a batchwise fashion (e.g., batch; semi-batch) or in a continuous process. Suitable reactors may include tank, loop, and tube designs. In at least one embodiment, the process is performed in a continuous fashion and dual loop reactors in a series configuration are used. In at least one embodiment, the process is performed in a continuous fashion and dual continuous stirred-tank reactors (CSTRs) in a series configuration are used.

Furthermore, the process can be performed in a continuous fashion and a tube reactor can be used. In another embodiment, the process is performed in a continuous fashion and one loop reactor and one CSTR are used in a series configuration. The process can also be performed in a batchwise fashion and a single stirred tank reactor can be used.

OTHER EMBODIMENTS OF THE PRESENT DISCLOSURE

Clause 1. A method for introducing an activator to a polymerization reactor comprising:

introducing an amount of liquid activator to a mixing vessel;

mixing an aliphatic hydrocarbon solvent with the liquid activator in the mixing vessel to form an activator solution; and introducing the activator solution to a polymerization reactor.

Clause 2. The method of clause 1, further comprising pumping the activator solution from the mixing vessel to the polymerization reactor.

Clause 3. The method of any of clauses 1, further comprising introducing the activator solution to a charge vessel before the introducing the activator solution to a polymerization reactor.

Clause 4. The method of clause 3, further comprising pumping the activator solution from the charge vessel to the polymerization reactor.

Clause 5. The method of any of clauses 1 to 4, further comprising measuring the amount of liquid activator entering the mixing vessel.

Clause 6. The method of clause 5, wherein the measuring of the amount of liquid activator is accomplished by use of a flowmeter in a line connecting a storage tank to the mixing vessel.

Clause 7. The method of clause 5, wherein the measuring of the amount of liquid activator is accomplished by use of a metering valve in a line connecting a storage tank to the mixing vessel.

Clause 8. The method of any of clauses 1 to 7, further comprising measuring the amount of aliphatic hydrocarbon entering the mixing vessel.

Clause 9. A method for introducing an activator to a polymerization reactor comprising:

introducing an amount of liquid activator to an inline mixer;

mixing an aliphatic hydrocarbon solvent with the liquid activator in the inline mixer to form an activator solution; and introducing the activator solution to a polymerization reactor.

Clause 10. The method of clause 9, further comprising pumping the activator solution from the inline mixer to the polymerization reactor.

Clause 11. The method of clause 9, further comprising introducing the activator solution to a charge vessel before the introducing the activator solution to a polymerization reactor.

Clause 12. The method of clause 11, further comprising pumping the activator solution from the charge vessel to the polymerization reactor.

Clause 13. The method of any of clauses 9 to 12, further comprising measuring the amount of liquid activator entering the inline mixer.

Clause 14. The method of clause 13, wherein the measuring of the amount of liquid activator is accomplished by use of a flowmeter in a line connecting a storage tank to the inline mixer.

Clause 15. The method of clause 13, wherein the measuring of the amount of liquid activator is accomplished by use of a metering valve in a line connecting a storage tank to the inline mixer.

Clause 16. The method of any of clauses 9 to 15, further comprising measuring the amount of aliphatic hydrocarbon entering the inline mixer.

Clause 17. A system for introducing an activator to a polymerization reactor comprising:

a storage vessel;

a mixing vessel configured to mix a liquid activator and aliphatic hydrocarbon solvent, wherein the mixing vessel is fluidly connected with the storage vessel; and a polymerization reactor fluidly connected with the mixing vessel.

Clause 18. The system of clause 17, further comprising a charge vessel fluidly connected with the mixing vessel and the polymerization reactor.

Clause 19. The system of any of clauses 17 to 18, further comprising a metered valve configured to measure an amount of activator introduced to the mixing vessel.

Clause 20. The system of any of clauses 17 to 19, further comprising a metered valve configured to measure an amount of aliphatic hydrocarbon solvent introduced to the mixing vessel.

Clause 21. A system for introducing an activator to a polymerization reactor comprising:

a storage vessel;

an inline mixer configured to mix a liquid activator and aliphatic hydrocarbon solvent, wherein the inline mixer is fluidly connected with the storage vessel; and a polymerization reactor fluidly connected with the inline mixer.

Clause 22. The system of clause 21, further comprising a charge vessel fluidly connected with the inline mixer and the polymerization reactor.

Clause 23. The system of any of clauses 21 to 22, further comprising a metered valve configured to measure an amount of activator introduced to the inline mixer.

Clause 24. The system of any of clauses 21 to 23, further comprising a metered valve configured to measure an amount of aliphatic hydrocarbon solvent introduced to the inline mixer.

Clause 25. A method for introducing an activator to a polymerization reactor comprising:

introducing an amount of aliphatic hydrocarbon solvent to an amount of liquid activator in a vessel to form an activator solution; and introducing the activator solution to a polymerization reactor.

Clause 26. A process for producing a polyolefin, the process comprising:

introducing an amount of liquid activator to an inline mixer;

mixing an aliphatic hydrocarbon solvent with the liquid activator in the inline mixer to form an activator solution; and introducing the activator solution, a catalyst, and an olefin feed to a polymerization reactor.

Clause 27. The process of clause 26, wherein the liquid activator has a density of about 0.8 g/ml.

Overall, it has been discovered that liquid activators for olefin polymerization may be prepared and introduced to a polymerization reactor in fewer vessels and with greater control over the quantities introduced as compared to conventional polymerization processes. The use of fewer vessels and lines permits a cost savings in installation and maintenance and also creates a system less prone to errors whether human or mechanical. Furthermore, the dissolution and metered introduction of liquid activators allows for precision in dispensing amounts of activator relative to the amount of catalyst used.

While the present disclosure has been described with respect to a number of embodiments and examples, those skilled in the art, having benefit of this disclosure, will appreciate that other embodiments can be devised which do not depart from the scope and spirit of the present disclosure. Furthermore, in some embodiments, the systems and processes of the present disclosure may suitably be practiced in the absence of any element which is not specifically disclosed.

What is claimed is:

1. A method for introducing an activator to a polymerization reactor comprising:

introducing an amount of liquid activator to a mixing vessel;

mixing an aliphatic hydrocarbon solvent with the liquid activator in the mixing vessel to form an activator solution; and introducing the activator solution to a polymerization reactor.

2. The method of claim 1, further comprising pumping the activator solution from the mixing vessel to the polymerization reactor.

3. The method of claim 1, further comprising introducing the activator solution to a charge vessel before the introducing the activator solution to a polymerization reactor.

4. The method of claim 3, further comprising pumping the activator solution from the charge vessel to the polymerization reactor.

5. The method of claim 1, further comprising measuring the amount of liquid activator entering the mixing vessel.

6. The method of claim 5, wherein the measuring of the amount of liquid activator is accomplished by use of a flowmeter in a line connecting a storage tank to the mixing vessel.

7. The method of claim 5, wherein the measuring of the amount of liquid activator is accomplished by use of a metering valve in a line connecting a storage tank to the mixing vessel.

8. The method of claim 1, further comprising measuring the amount of aliphatic hydrocarbon entering the mixing vessel.

9. The method of claim 1, wherein aromatics are present at less than 1 wt %, based upon the total weight of solvent in the activator solution.

10. The method of claim 1, wherein the mixing vessel is an inline mixer.

11. The method of claim 1, wherein the liquid activator has a density of about 0.8 g/ml.

12. A system for introducing an activator to a polymerization reactor comprising:

a storage vessel;

a mixing vessel configured to mix a liquid activator and an aliphatic hydrocarbon solvent to form an activator solution, wherein the mixing vessel is coupled with the storage vessel;

a flowmeter or metered valve configured to measure an amount of the liquid activator introduced to the mixing vessel; and a polymerization reactor fluidly connected with the mixing vessel.

13. The system of claim 12, further comprising a charge vessel fluidly connected with the mixing vessel and the polymerization reactor.

14. The system of claim 13, further comprising at least one pump configured to transfer the activator solution from the charge vessel to the polymerization reactor at a rate of about 0.1 L/h to about 500 L/h.

15. The system of claim 12, further comprising a flowmeter or metered valve configured to measure an amount of the aliphatic hydrocarbon solvent introduced to the mixing vessel.

16. A system for introducing an activator to a polymerization reactor comprising:

a storage vessel;

an inline mixer configured to mix a liquid activator and an aliphatic hydrocarbon solvent to form an activator solution, wherein the inline mixer is fluidly connected with the storage vessel;

a flowmeter or metered valve configured to measure an amount of the liquid activator introduced to the inline mixer; and a polymerization reactor fluidly connected with the inline mixer.

17. The system of claim 16, further comprising a mixing vessel fluidly connected with the inline mixer and the polymerization reactor.

18. The system of claim 17, further comprising at least one pump configured to transfer the activator solution from the mixing vessel to the polymerization reactor at a rate of about 0.1 L/h to about 500 L/h.

19. The system of claim 16, further comprising a second flowmeter or metered valve configured to measure an amount of the aliphatic hydrocarbon solvent introduced to the inline mixer.

* * * * *